US012065336B1

(12) United States Patent
Mourlam et al.

(10) Patent No.: US 12,065,336 B1
(45) Date of Patent: Aug. 20, 2024

(54) SLEW DRIVE SYSTEM FOR AERIAL PLATFORM LEVELING

(71) Applicant: Altec Industries, Inc., Birmingham, AL (US)

(72) Inventors: Timothy J. Mourlam, Shawnee, KS (US); William Naber, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/380,510

(22) Filed: Oct. 16, 2023

(51) Int. Cl.
*B66F 11/04* (2006.01)
*B66F 7/22* (2006.01)
*B66F 17/00* (2006.01)
*H02G 1/02* (2006.01)

(52) U.S. Cl.
CPC .............. *B66F 11/046* (2013.01); *B66F 7/22* (2013.01); *B66F 17/006* (2013.01); *H02G 1/02* (2013.01)

(58) Field of Classification Search
CPC ........ B66F 7/22; B66F 11/046; B66F 17/006; H02G 1/02
See application file for complete search history.

(56) References Cited

U.S. PATENT DOCUMENTS

| 3,791,484 | A | * | 2/1974 | Harrison | E01D 19/106 |
| | | | | | 182/2.2 |
| 8,443,936 | B1 | * | 5/2013 | Raymond | B66F 11/046 |
| | | | | | 182/2.1 |
| 8,857,567 | B1 | * | 10/2014 | Raymond | B66C 23/702 |
| | | | | | 182/2.1 |
| 2003/0173151 | A1 | * | 9/2003 | Bodtke | B66F 17/006 |
| | | | | | 182/2.11 |
| 2011/0007157 | A1 | * | 1/2011 | Sekelsky | G01S 13/867 |
| | | | | | 348/143 |
| 2012/0211301 | A1 | * | 8/2012 | Clark | B66F 17/006 |
| | | | | | 182/2.2 |
| 2018/0195589 | A1 | * | 7/2018 | Mark | B66F 17/006 |
| 2020/0148510 | A1 | * | 5/2020 | Rauscher | B66C 13/066 |

* cited by examiner

*Primary Examiner* — Charles J Han
(74) *Attorney, Agent, or Firm* — Erise IP, P.A.

(57) ABSTRACT

An aerial device for operating on energized powerlines is disclosed. Embodiments of the current disclosure relate to a slew drive system for an aerial device. In some embodiments, the slew drive system provides leveling and jerk mitigation to an aerial platform of the aerial device. Various sensors may be disposed on an aerial device boom, on the slew drive, and on the aerial platform, for obtaining data indicative of a state of the aerial device. The data indicative of the state of the aerial device may be used to control the slew drive with various hydraulic valves and motors to level the aerial platform and mitigate/eliminate jerk. The systems and methods described herein provide a comfortable riding experience for aerial line workers in the aerial platform and maintain a level state of the aerial platform across a wide range of boom angles including at extreme ends of the boom assembly.

20 Claims, 18 Drawing Sheets

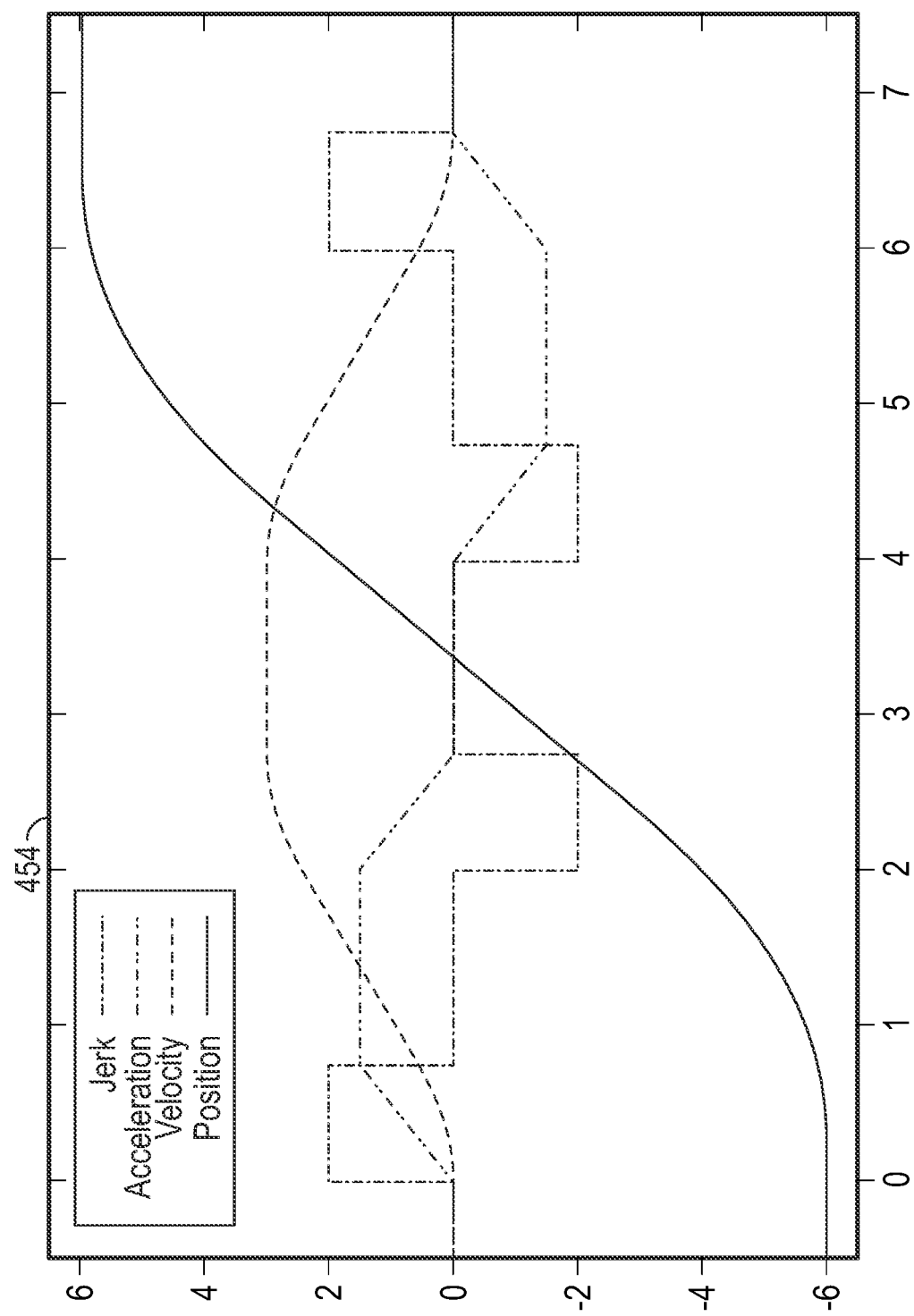

SLEW DRIVE SYSTEM FOR AERIAL PLATFORM LEVELING

BACKGROUND

1. Field

Embodiments of the present disclosure relate to aerial devices. Specifically, embodiments of the present disclosure relate to a slew drive system for an aerial device.

2. Related Art

Aerial devices for working on energized power lines generally comprise a lower, electrically non-insulating boom section, and an upper, electrically insulating boom section such that a dielectric gap is created to enable workers to raise, repair, and perform maintenance tasks on, the energized power lines. Generally, aerial devices include a base, a boom, and an aerial platform. Workers are supported in the aerial platform and raised to a working area where the workers work on the power lines. Furthermore, equipment may also be supported and raised by the aerial platform. In typical current systems, as the platform is raised the platform may tilt, sway, and jerk due to the motion of the boom, the hydraulics, and the actuators all moving to raise the platform with people and equipment. In some scenarios, the equipment may hang from a hook by a tether creating a swinging pendulum effect that causes even more uncommanded motion to the platform.

Furthermore, typical systems for rotating aerial platforms are limited in their rotational motion. As the platform is raised, typical actuators, such as hydraulic pistons, provide linear motion to rotate the platform in an attempt to level the platform while the platform is raised by the boom. As the relationship between the rotational motion of the boom and the rotation to keep the platform level is non-linear, the typical actuators struggle to keep the platform level, particularly at extreme ends of the boom extension.

What is needed is a system that allows full rotational control across the non-linear relationship between the boom and the aerial platform rotation and a control system that provides a smooth and level ride for the workers in the aerial platform.

SUMMARY

Embodiments of the present disclosure solve the above-mentioned problems by providing a slew drive system for an aerial device. In some embodiments, the slew drive system provides 270 degrees of rotation while controlling leveling and jerk mitigation of a boom assembly and an aerial platform of the aerial device. Various sensors may be disposed on the aerial device boom assembly, on the slew drive, and on the aerial platform, for obtaining data indicative of a state of the boom assembly and the aerial device. The data indicative of the state of the boom assembly, the slew drive, and the aerial device may be used along with commands (manual or automatic) to control the slew drive with various hydraulic valves and motors to level the aerial platform and mitigate jerk. The systems and methods described herein provide a comfortable riding experience for aerial line workers in the aerial platform as well as maintain a level aerial platform across a wide range of angles including at extreme ends of motion of the aerial device boom assembly.

In some aspects, the techniques described herein relate to a slew drive system for leveling an aerial platform of an aerial device. The slew drive system includes a slew drive disposed at a boom tip of a boom assembly of the aerial device, wherein the slew drive is positioned between the boom tip and the aerial platform and is configured to rotate the aerial platform relative to the boom tip, a first set of sensors detecting at least an angle of the boom tip; a second set of sensors detecting a drive position of a leveling bearing of the slew drive, and at least one controller. The at least one controller is configured to obtain at least the angle from the first set of sensors and at least the drive position from the second set of sensors; and determine a leveling bearing command to control the leveling bearing to maintain a level attitude of the aerial platform based on the angle of the boom tip and the drive position of the leveling bearing.

In some aspects, the techniques described herein relate to the slew drive system, wherein the first set of sensors includes at least an accelerometer configured to detect a gravity vector relative to the angle of the boom tip, and wherein the at least one controller is further configured to determine the leveling bearing command based on the gravity vector relative to the angle of the boom tip.

In some aspects, the techniques described herein relate to the slew drive system, further including at least one actuator configured to control a rotation of the aerial platform perpendicularly to the rotation of the slew drive.

In some aspects, the techniques described herein relate to the slew drive system, wherein the at least one actuator provides at least 180 degrees of rotation and is controlled by an operator in the aerial platform, and wherein the slew drive provides at least 270 degrees of operable rotation to the aerial platform.

In some aspects, the techniques described herein relate to the slew drive system, further including a third-order controller configured to determine the leveling bearing command to limit a boom velocity, a boom acceleration, and a boom jerk of the aerial platform based at least in part on an angular rate, an angular acceleration, and an angular jerk associated with a joint or a boom section of the boom assembly.

In some aspects, the techniques described herein relate to the slew drive system, wherein a velocity of the boom tip and a drive velocity of the slew drive are input parameters input into the at least one controller configured to maintain the level attitude of the aerial platform.

In some aspects, the techniques described herein relate to the slew drive system, wherein the first set of sensors is disposed at a joint of the boom assembly and a joint angle is indicative of the angle of the boom tip, and wherein the angle of the boom tip is based at least in part on the joint angle of the boom assembly.

In some aspects, the techniques described herein relate to the slew drive system, wherein the angle of the boom tip is controlled by an automated request to change a configuration of the boom assembly.

In some aspects, the techniques described herein relate to a slew drive system for leveling an aerial platform of an aerial device. The slew drive system includes a slew drive disposed at a boom tip of a boom assembly of the aerial device, wherein the slew drive is positioned between the boom tip and the aerial platform and is configured to rotate the aerial platform relative to the boom tip, a first set of sensors detecting boom tip parameters indicative of a boom tip state of the boom tip, a second set of sensors detecting leveling bearing parameters indicative of a leveling bearing state of a leveling bearing of the slew drive, and at least one controller. The at least one controller is configured to obtain the boom tip parameters and the leveling bearing parameters, and determine a leveling bearing command to control the leveling bearing to maintain a level attitude of the aerial platform based on the boom tip parameters and the leveling bearing parameters.

In some aspects, the techniques described herein relate to the slew drive system, wherein the boom tip parameters include an angle of an upper boom section of the boom assembly, and wherein the leveling bearing parameters include at least a position of the leveling bearing.

In some aspects, the techniques described herein relate to the slew drive system, wherein the boom tip parameters further include an angular rate of the upper boom section, and wherein the leveling bearing parameters include at least a rate of the leveling bearing.

In some aspects, the techniques described herein relate to the slew drive system, wherein the at least one controller is further configured to determine an angular acceleration of the upper boom section, and determining the leveling bearing command further based on limiting the angular acceleration of the upper boom section.

In some aspects, the techniques described herein relate to a slew drive system, wherein the boom tip parameters include at least an angle of a joint of the boom assembly and an angular rate of the joint, and wherein the leveling bearing parameters include at least a position and a speed of the leveling bearing.

In some aspects, the techniques described herein relate to a slew drive system, further including at least one sensor configured to detect an angle of gravity at the boom tip, and wherein the at least one controller is further configured to obtain the angle of gravity from the at least one sensor; and determine the leveling bearing command further based on the angle of gravity relative to the boom tip.

In some aspects, the techniques described herein relate to a method of leveling an aerial platform of an aerial device. The method includes detecting at least a gravity angle relative to a boom tip of a boom assembly of the aerial device, detecting a drive position of a leveling bearing of a slew drive, wherein the slew drive is positioned between the boom tip and the aerial platform and is configured to rotate the aerial platform relative to the boom tip, and determining a leveling bearing command, by at least one processor, to maintain a level attitude of the aerial platform based on the gravity angle relative to the boom tip and the drive position of the leveling bearing of the slew drive.

In some aspects, the techniques described herein relate to the method, further including determining an angle of a joint of the boom assembly and an angular rate of the joint, and determining the leveling bearing command further based on the angle of the joint and the angular rate of the joint.

In some aspects, the techniques described herein relate to the method, further including limiting velocity, acceleration, and jerk of at least one joint of the boom assembly.

In some aspects, the techniques described herein relate to the method, wherein the leveling bearing provides at least 270 degrees of operable rotation to the aerial platform.

In some aspects, the techniques described herein relate to the method, wherein the leveling bearing is a gear drive.

In some aspects, the techniques described herein relate to the method, further including providing a rotate bearing configured to rotate the aerial platform in a range of 180 degrees perpendicularly to a rotation of the leveling bearing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 4F depicts the components of the elevator motion profile;

Figure 1A:
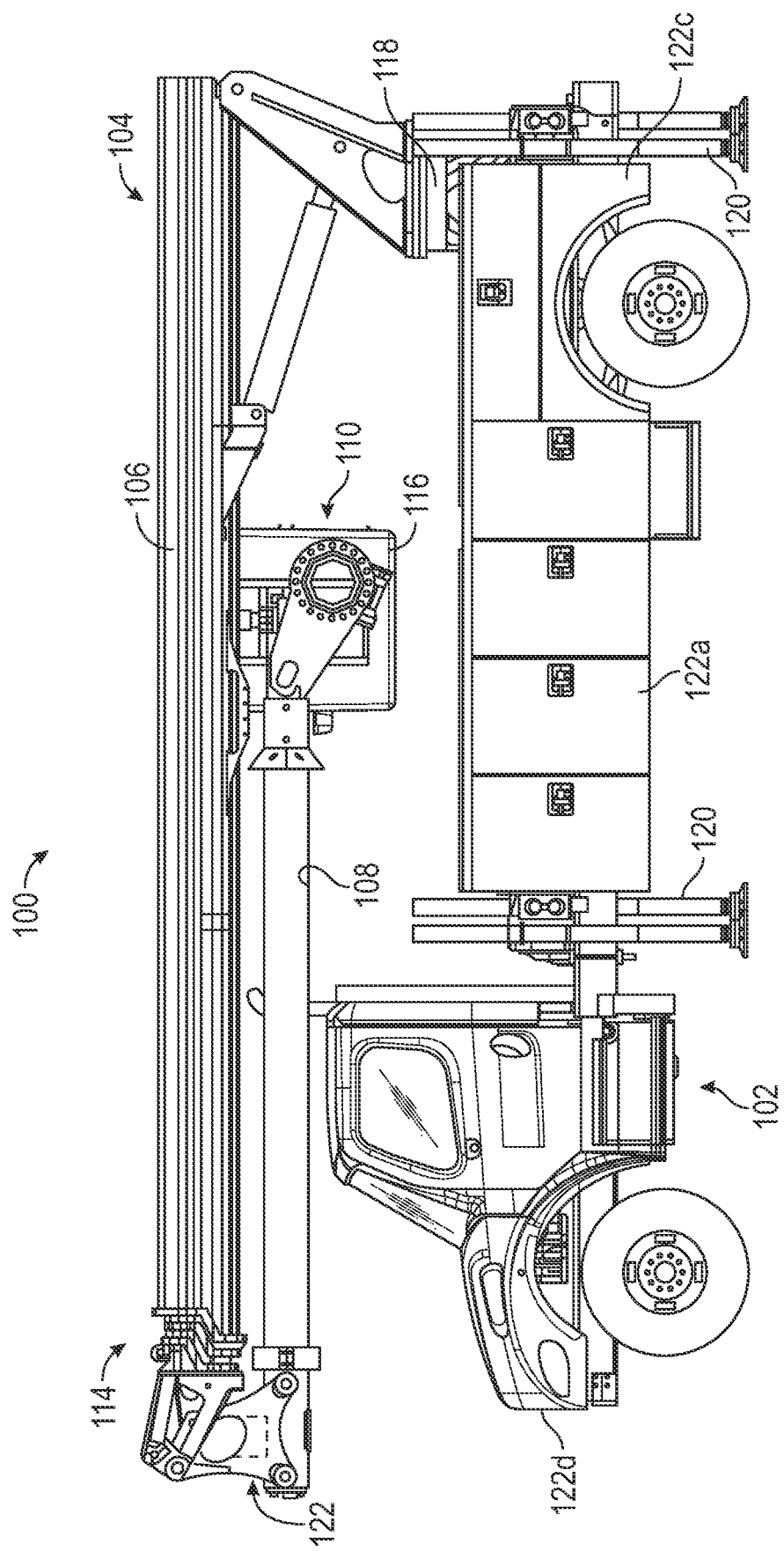
FIG. 1A illustrates an aerial device in a stowed for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense.

The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to a slew drive system for leveling an aerial platform and limiting velocity, acceleration, and jerk associated with a boom assembly of an aerial device. In some embodiments, the slew drive system provides 270 degrees of rotation while controlling leveling and jerk mitigation of the boom assembly and the aerial platform of the aerial device. Various sensors may be disposed on the aerial device boom assembly, on the slew drive, and on the aerial platform, for obtaining data indicative of a state of the boom assembly and the aerial device. The data indicative of the state of the boom assembly, the slew drive, and the aerial device may be used along with commands (manual or automatic) to control the slew drive with various hydraulic valves and motors to level the aerial platform and mitigate jerk. The systems and methods described herein provide a comfortable riding experience for aerial line workers in the aerial platform as well as maintain a level aerial platform across a wide range of angles including at extreme ends of motion of the aerial device boom assembly.

Aerial Device

Figure 1B:
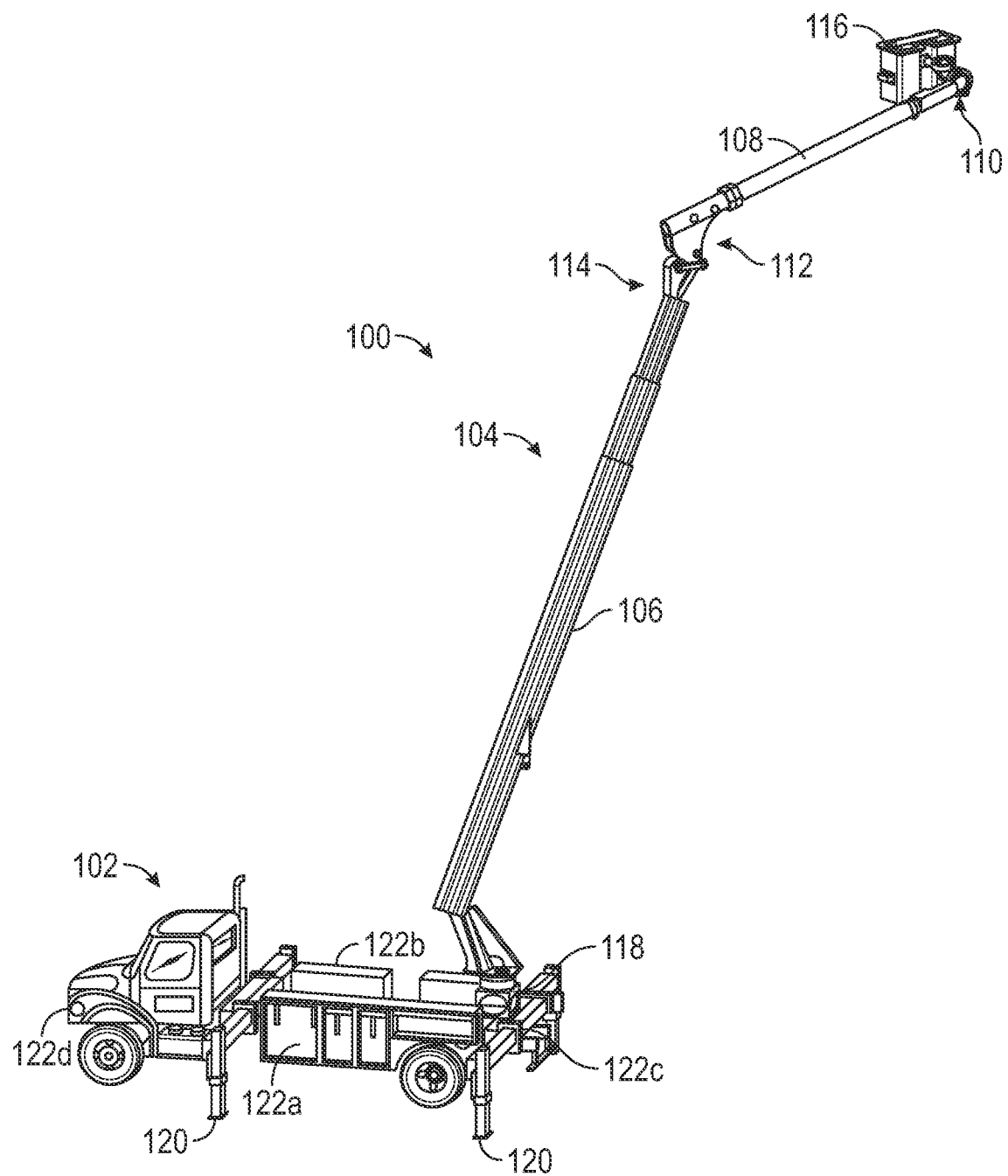
FIG. 1B illustrates the aerial device in a deployed position for some embodiments.

FIG. 1A illustrates an aerial device 100 in a stowed position in accordance with embodiments of the present disclosure. FIG. 1B illustrates aerial device 100 in a non-stowed or working position for some embodiments of the present disclosure. Aerial device 100 may be attached to utility vehicle 102, as shown. In some embodiments, aerial device 100 comprises a boom assembly 104. The boom assembly 104 may comprise a proximal or lower boom section 106, a distal or upper boom section 108 (also referred to as a flyboom), and a boom tip 110. In some embodiments, boom assembly 104 is an underfold or underslung boom assembly in which upper boom section 108 folds beneath lower boom section 106 when boom assembly 104 is in the stowed position. In some embodiments, either or both of lower boom section 106 and upper boom section 108 may include a telescoping portion for telescopically extending and retracting the length of boom assembly 104. In some embodiments, lower boom section 106 is a three-stage telescoping boom. Generally, lower boom section 106 may comprise any number of stages. In some embodiments, aerial device 100 is an articulating boom. An exemplary boom assembly 104 is discussed in commonly-owned U.S. application Ser. No. 18/380,486, titled "AERIAL DEVICE" the entirety of which is incorporated by reference herein.

Lower boom section 106 and upper boom section 108 may be connected via a connecting assembly 112 configured to manage the load transition between the distinct materials forming lower boom section 106 and upper boom section 108, as discussed further hereinafter. Aerial device 100 may further comprise a 4-bar mechanism 114 for articulating upper boom section 108. In some embodiments, the 4-bar mechanism 114 enables upper boom section 108 to rotate at least 180 degrees relative to the stowed position. In some embodiments, the 4-bar mechanism 114 is configured to articulate upper boom section 108 to an angle of at least −20 degrees relative to the stowed position.

Boom tip 110 may be coupled to a aerial platform 116, which may have a jib thereon (not shown). Aerial platform 116 may be a bucket, for example, in which a lineman may be positioned to operate on an energized line. Boom tip 110 may be coupled to upper boom section 108 via a pinned connection, as discussed further below with respect to FIGS. 4A-4B. In some embodiments, boom tip 110 is coupled to a slew driver level configured to maintain aerial platform 116 at a level working position. An exemplary slew drive leveler is discussed in commonly-owned U.S. application Ser. No. 18,396,009, titled "AUTOMATIC BOND ON TO ENERGIZED POWER LINE FOR REMOTE OPERATIONS" the entirety of which is incorporated by reference herein. In some embodiments, boom tip 110 supports a robotic assembly that may be remotely controlled by an operator working remotely from the energized powerline. Herein, aerial platform may reference a robot platform supporting the robotic assembly or may reference the robotic assembly. The slew drive system description may be consistently used with an aerial platform, a robot system, a cutting system (e.g., tree or conductor), and any other system that may be operable at boom tip 110.

Aerial device 100 may further comprise a turntable 118 located on utility vehicle 102. Turntable 118 may be coupled to a proximal end of lower boom section 106 and may pivotally move boom assembly 104. Turntable 118 may rotate between 0 and 360 degrees to cause corresponding rotation of boom assembly 104. Utility vehicle 102 may comprise one or more outriggers 120 for stabilizing utility vehicle 102.

Aerial device 100 may be used for performing work on or near high-voltage power lines. As such, aerial device 100 may be operated near electrically powered high-voltage cables. In some embodiments, aerial platform 116 and boom assembly 104 comprise insulating material for electrically insulating aerial device 100. Further, any electrical components disposed in aerial platform 116 and/or boom assembly 104 may be self-contained and separate from the electrical components of utility vehicle 102. Accordingly, a dielectric gap is created between boom assembly 104 and utility vehicle 102. In some embodiments, lower boom section 106 is non-insulating and may be formed from steel, for example, and upper boom section 108 is insulating and may be formed from fiberglass, for example. In some embodiments, utility vehicle 102 may generally be referred to as a base, and may be any of a vehicle, a crane, a platform, a truck bed, a mechanical tree trimming apparatus, or any other base capable of supporting aerial device 100.

Aerial device 100 may have a maximum working height of about 105 feet. Boom tip 110 may be configured to support a weight of about 1500 pounds. Aerial device 100 may have a side reach off of the sides 122a, 122b and rear 122c of utility vehicle 102 of about 56 feet. Aerial device 100 may have a side reach off the front 122d of utility vehicle 102 of about 47 feet. It will be appreciated that the dimensions provided above are exemplary, and that other dimensions may be employed without departing from the scope of the present disclosure.

Slew Drive System

Figure 2A:
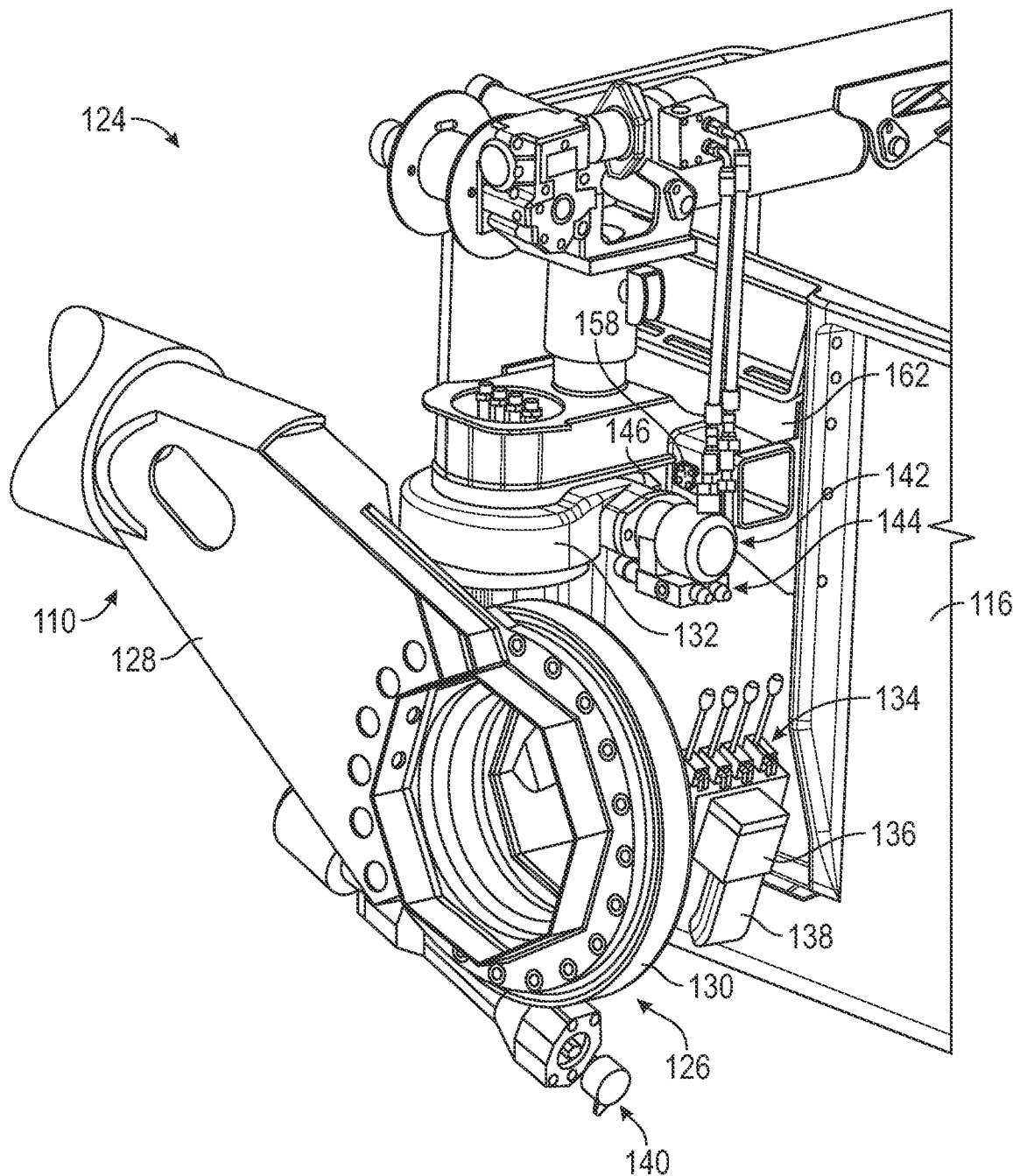
FIG. 2A depicts an exemplary embodiment of a slew drive system from a front side of slew drive bulkhead.
Figure 2B:
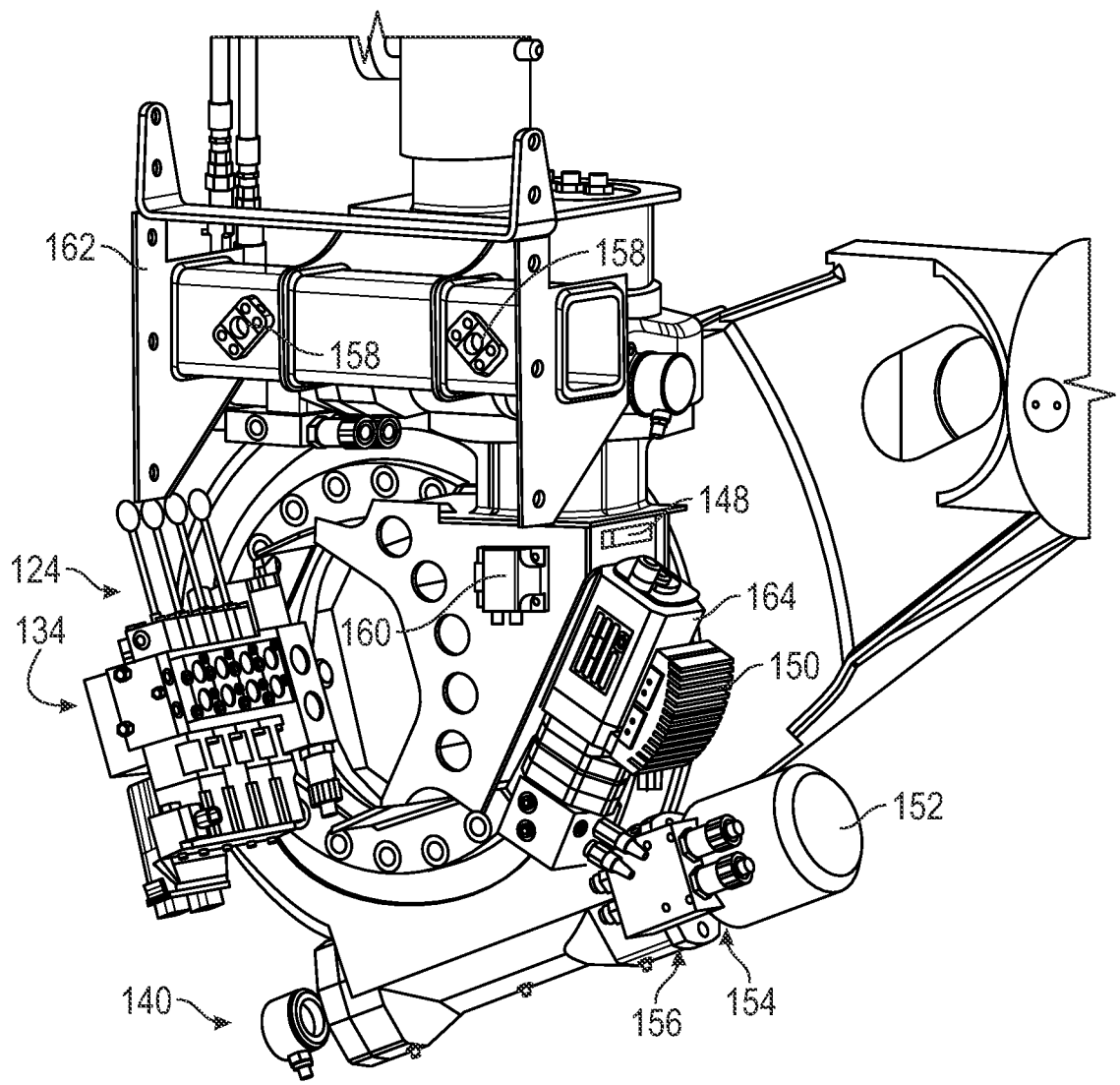
FIG. 2B depicts an exemplary embodiment of the slew drive system from a back side of slew drive bulkhead.

FIGS. 2A and 2B depict an embodiment of slew drive system 124 from a front side of slew drive 126 (FIG. 2A)

and a back side of slew drive 126 (FIG. 2B). In some embodiments, slew drive 126 comprises bulkhead 128, leveling bearing 130, rotate bearing 132, valves 134, battery 136, valve drivers 138, leveling encoders 140, rotate motor 142, rotate valves 144, pressure transducers 146, inclinometer 148, generator 150, leveling motor 152, leveling valves 154, leveling transducers 156, load cells 158, inertial measurement unit (IMU) 160, as well as other sensors disposed on slew drive 126, aerial platform 116, and boom assembly 104. Slew drive system 124 may provide rotation of aerial platform 116 relative to boom tip 110 by leveling valves 154 and leveling motor 152 causing slew drive 126 to actuate. Slew drive 126 may be connected directly to aerial platform 116 or may be connected through level frame 162. Furthermore, computing component 164 may be provided at boom tip 110 at any location associated with slew drive 126, and/or computing components may be provided as ground/based locations and wireless communication may be provided. Here, in some embodiments, the objective of the rotation provided by slew drive 126 is to maintain level aerial platform 116 relative to gravity while maintaining comfort (minimizing jerk) for any user (platform worker) in aerial platform 116 and reducing induced oscillation in boom assembly 104 therefore, reducing the forces/stresses on the structures of aerial device 100.

Furthermore, the use of slew drive 126 provides a more freely rotating system than typical linear cylinder-pin combinations. In typical aerial systems, to get a range of motion, e.g. 270 deg, the linear cylinder must be actuated through a three or four or five bar linkage and that drives the non-linearity motion. Here, slew drive 126 provides a torque output and speed output throughout the entire range of motion of slew drive 126 providing a direct relationship between slew drive position and speed and aerial platform position and speed.

In some embodiments, slew drive 126 may be controlled by any user directly or remotely (wired or wireless) operating electromechanical actuators (e.g., valve drivers 138), valves (e.g., rotate valves 144), and/or rotate motor 142; however, in some embodiments, various sensors and controllers may be utilized to provide signals to the electromechanical actuators for operation of slew drive 126. In some embodiments, IMU 160, inclinometer 148, leveling transducers 156, load cells 158, and any other general sensors may detect various parameters associated with boom tip 110 including geographic position, relative position, velocity, acceleration, and any other parameters that may provide a complete state of boom tip 110. The boom tip 110 state may be determined in any coordinate system; however, Cartesian and/or angular/polar coordinate systems will be described herein as many of the position and velocity calculations are described in boom/drive angles and boom/drive angle rates. However, it should be noted that any transformation between any defined and/or generally used coordinates systems may be used.

In some embodiments, slew drive 126 is mounted at an end of boom tip 110. Slew drive 126 may comprise bulkhead 128 that attaches boom tip 110 to slew drive 126. Leveling bearing 130 of slew drive 126 may provide rotation between bulkhead 128 and level frame 162. As such, level frame 162 (connected to aerial platform 116) may rotate relative to boom tip 110 based on leveling bearing 130 providing rotation to aerial platform 116. As such, leveling bearing 130 of slew drive 126 may be commanded to rotate resulting in rotation of aerial platform 116 relative to boom tip 110. In some embodiments, leveling bearing 130 may be a gear drive (e.g., worm drive) or any other type of slew drive bearing providing the described rotation. In some embodiments, the gear drive may be concentric, parallel, right angle, shaft mount, or any other type of gear drive. Embodiments herein describe hydraulic powering but slew drive 126 may be powered by any motor (i.e., leveling motor 152) providing electrical, pneumatic, hydraulic, and/or mechanical energy for operation. In some embodiments, leveling encoders 140 may detect an angular position of leveling bearing 130 for feedback into controllers described below. As such, a relationship between the position, velocity, and acceleration of boom tip 110 and position, velocity, and acceleration of aerial platform 116 may be known through position, velocity, and acceleration of leveling bearing 130 determined through leveling encoders 140.

As described above, strict electrical isolation may be provided between slew drive system 124 and any ground-based components. Therefore, the components of slew drive system 124 may be provided at boom tip 110 rather than at ground-based components of aerial device 100. As such, communication between slew drive system 124 and any processors may be wired if the processors are disposed at boom tip 110; however, if processors are disposed at ground-based components, the communication may be wireless or by way of optics. As such, slew drive system 124 may comprise any computer components shown in FIG. 6 at boom tip 110, aerial platform 116, and/or at ground-based components of aerial device 100. Here, computing component 164 is shown mounted to leveling frame 162. Furthermore, slew drive system 124 may be in direct communication with controls provided on aerial platform 116. As such, aerial line workers in aerial platform 116 may have full control and may be able to override any controls of slew drive system 124 described herein.

In some embodiments, power to electrical systems may be provided by generator 150 and/or battery 136. Generator 150 may be run by leveling motor 152 providing mechanical energy that is transferred into electrical energy by generator 150 and stored at battery 136. As such, any electrical systems (including slew drive 126, in some embodiments) may be powered by battery 136.

In some embodiments, valve drivers 138 may be electromechanical actuators powered by battery 136 and operable to actuate valves 134. The actuation of valves 134 may result in fluid pressure being applied to slew drive 126 directly or through leveling valves 154 to rotate leveling bearing 130 to rotate aerial platform 116. As such, a direct relationship between the command of valve drivers 138 and the rotation of aerial platform 116 can be established and valve drivers 138 may be commanded manually by users operating controls or autonomously be the various controllers described herein and shown in FIGS. 4A-4E.

FIG. 2B depicts an embodiment of slew drive system 124 from a back side of slew drive 126. In some embodiments, slew drive system 124 comprises various sensors for detecting states of slew drive 126 and obtains data from the various sensors for controlling slew drive 126. Various sensors may detect the states of slew drive 126 and aerial platform 116 and the state of slew drive 126 and aerial platform 116 may be input into the various below-described controllers to autonomously control slew drive 126 based on the state of aerial device and slew drive.

In some embodiments, IMU 160 and other sensors comprise various sensors such as, for example, accelerometers, rate gyros, strain gauges, pressure sensors, as well as the above-described sensors. The sensors may be utilized at least to determine angular position of various components. For example, accelerometers (e.g., IMU 160 and inclinometer 148) may be used to determine an angle of boom tip 110 relative to the gravity vector to provide an indication of boom tip 110 orientation. As such, a position of leveling bearing 130 providing aerial platform 116 may be calibrated to level based on the boom tip 110 orientation and the position of leveling bearing 130. Here, leveled means that a part of aerial platform 116, such as the floor, control panel, rim, and the like may be perpendicular to the gravity vector. In some embodiments, any portion of leveling frame 162 may be compared to gravity to determine arial platform levelness. When the position of leveling bearing 130 relative to aerial platform 116 is known, the relative difference between boom tip 110 position and aerial platform 116 (or leveling bearing 130) level is known. As such, aerial platform 116 can be leveled by commanding slew drive to a position based on boom tip 110 position.

In some embodiments, slew drive 126 may be commanded based on position and speed of aerial platform 116 based on the position and velocity detected by sensors and determined by processors. Rates may be measured directly by rate gyros and accelerometers of IMU 160 and other sensors, and/or may be calculated based on position changes and command inputs. The rate control may provide smooth transitions based on the command inputs and the measured positions by, for example, leveling encoders 140 measuring a position of leveling bearing 130 described above. In some embodiments, jerk may also be controlled as a third-order derivative and controlled based on calculations described in embodiments below.

Figure 2C:
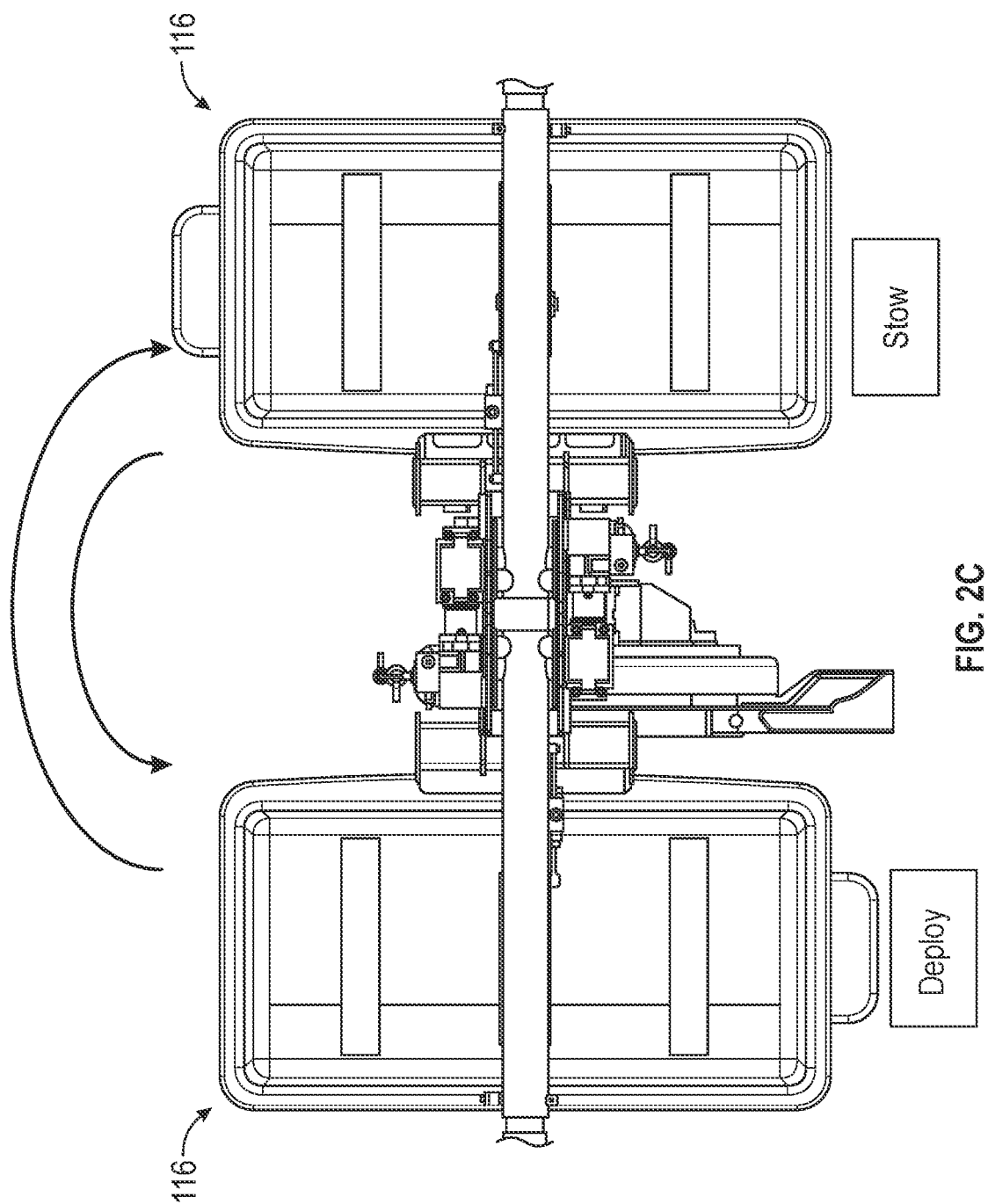
FIG. 2C depicts a top view illustrating an exemplary range of motion of the aerial platform relative to the slew drive.

FIG. 2C depicts a top view illustrating an exemplary range of motion of aerial platform 116 provided by rotate bearing 132, rotate motor 142, rotate valves 144, pressure transducers 146, and rotate any associated sensors (e.g., rotation and linear encoders). Aerial platform 116 may rotate side to side relative to rotation provided by slew drive 126 as shown. The horizontal rotation may place aerial platform 116 in a stowed position and may rotate aerial platform 116 by rotate bearing 132 to each side of boom assembly 104 to place aerial platform 116 in a position for workers to perform work.

Figure 2D:
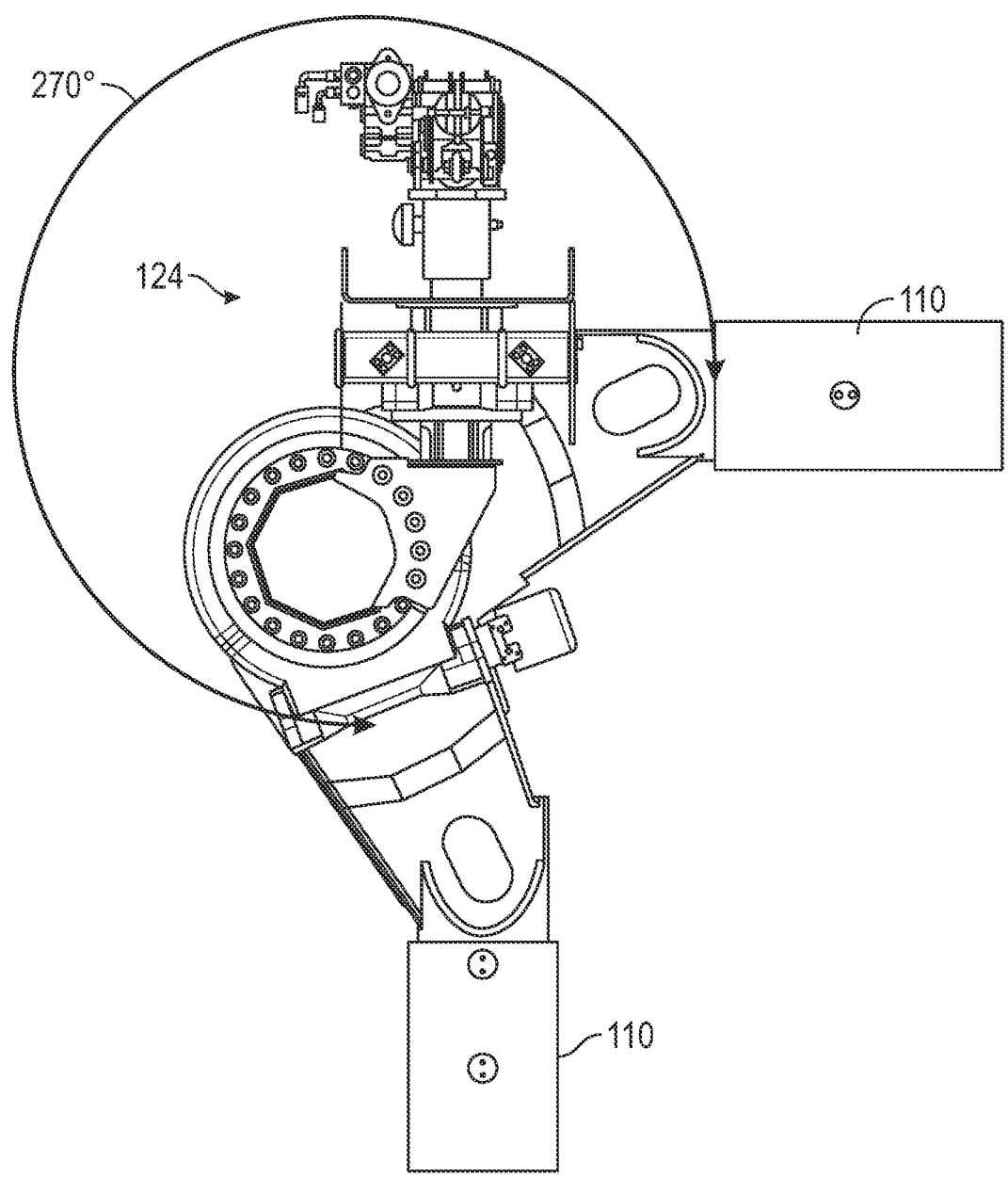
FIG. 2D depicts a side view illustrating an exemplary range of motion of the aerial platform provided by the slew drive.

FIG. 2D depicts a side view illustrating an exemplary range of motion of aerial platform 116 relative to boom assembly 104. Here, the motion may be provided by slew drive 126. As stated above, the range of motion of typical aerial platforms is limited. Slew drive 126, theoretically, may provide infinite rotation. In reality, aerial platform 116 may be rotated up to approximately 270 degrees in operation by slew drive 126, as shown. In some embodiments, slew drive 126 may be automatically controlled to maintain a position of aerial platform 116 that is level or approximately level, or perpendicular to the Earth's gravity vector as measured by onboard sensors. Therefore, the operator of aerial device 100 may move, or program boom assembly 104 to move, to an aerial work environment such that workers, or robots, disposed at the location of aerial platform 116, may perform work. While the operator, or programs, are moving boom assembly 104, slew drive system 124 controllers (discussed in detail below) may command rotation of slew drive 126 (and/or associated actuators) to maintain level attitude of aerial platform 116. As such, boom assembly 104 may be rotated through a range of angles (shown in FIG. 3B) while maintaining level at aerial platform 116.

Figure 2E:
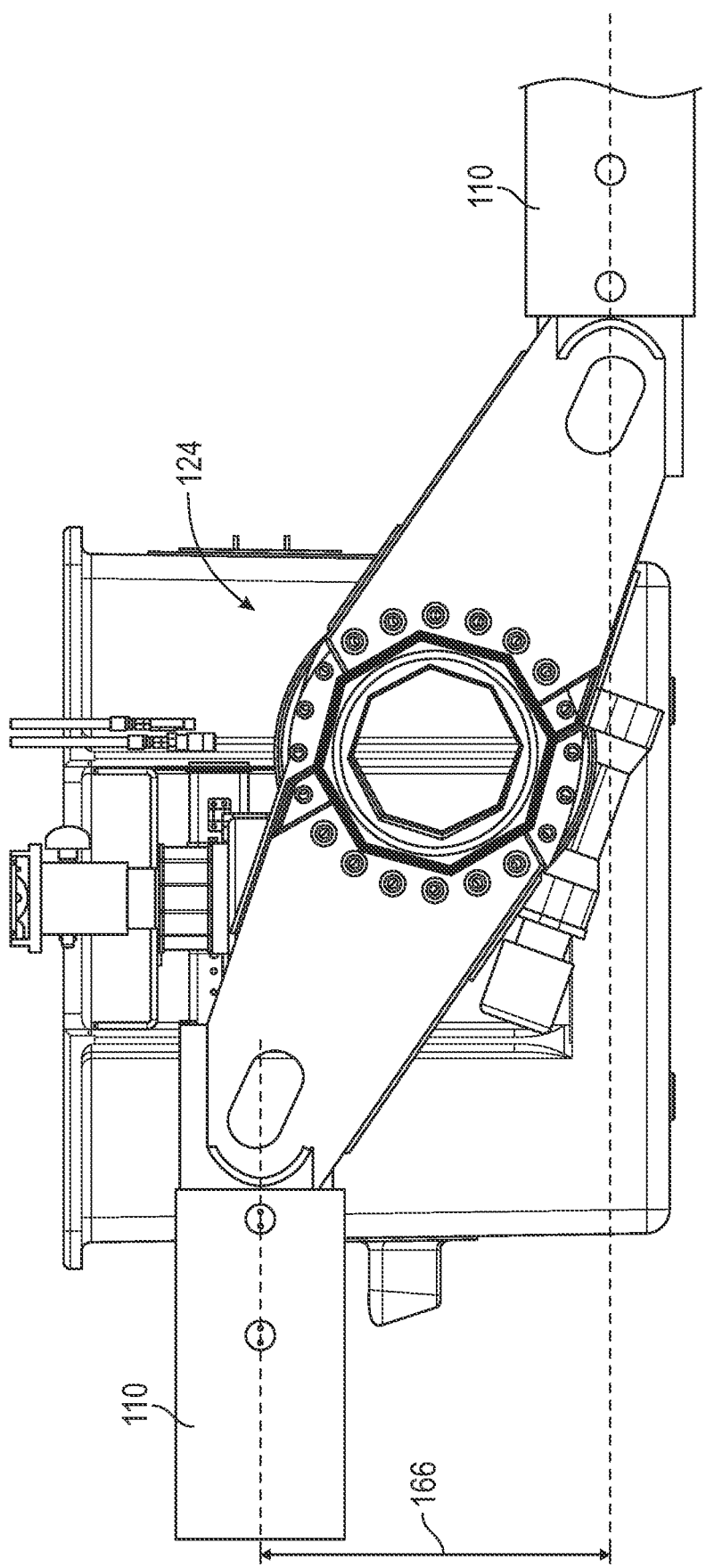
FIG. 2E depicts an offset of the aerial platform caused by slew drive.

As shown in FIG. 2E, when boom assembly 104 is rotated 90 degrees, offset 166 exists. As such, compensation may be provided by the below-described controllers. The relationship between boom tip 110 position and the associated boom assembly joints (J1-J4, FIG. 3A) may provide a relative position of leveling bearing 130 such that aerial platform 116 is level. As such, this, or any offset, may be accounted for in the non-linear relationships discussed below.

Boom Assembly Joints and Motion

Figure 3A:
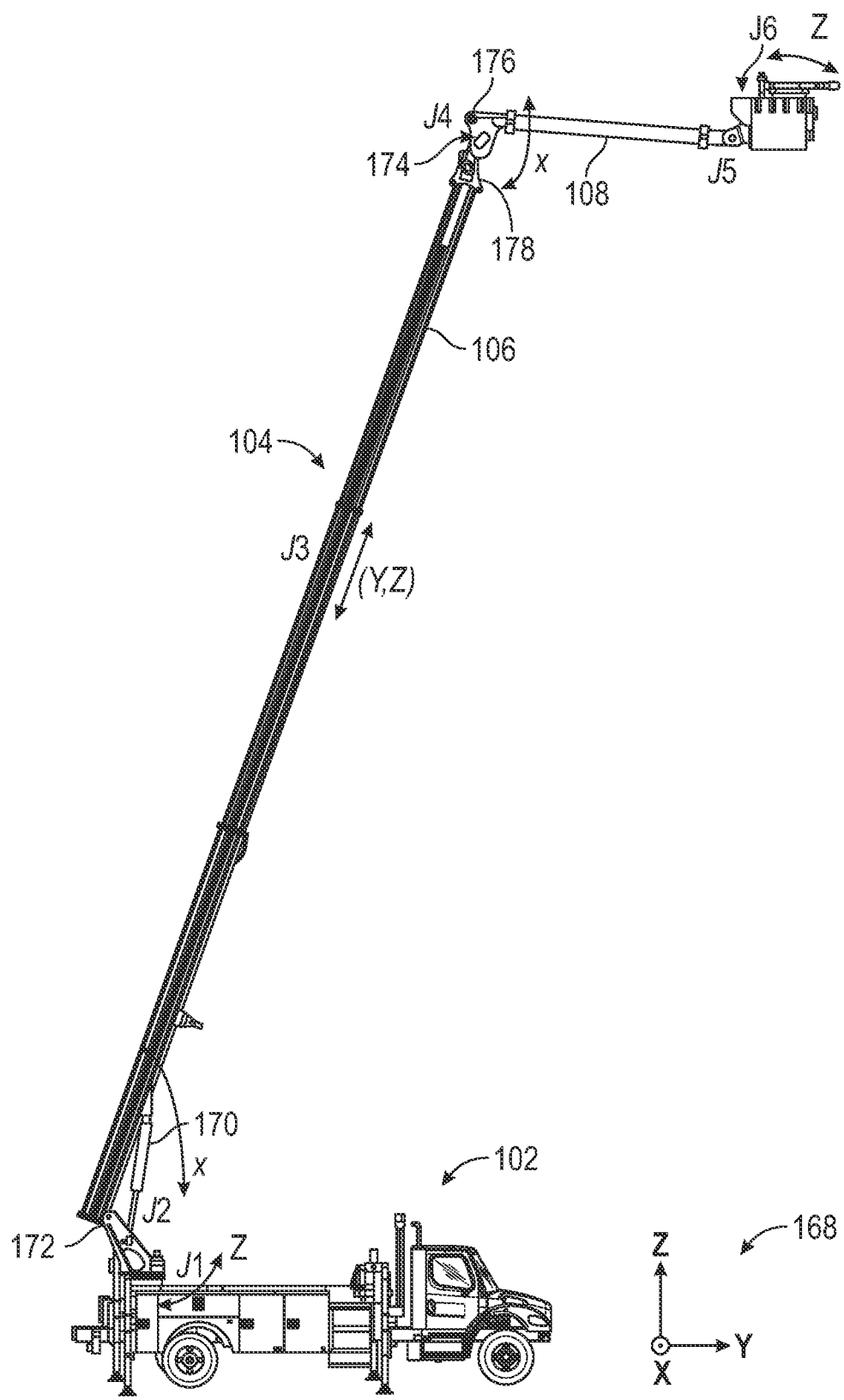
FIG. 3A depicts an exemplary embodiment of the joints of the boom assembly.

FIG. 3A depicts an exemplary embodiment of the joints of boom assembly 104 including joint 1 (J1), joint 2 (J2), joint 3 (J3), joint 4, (J4), joint 5 (J5, FIG. 2A), and joint 6 (J6, FIG. 2A). In some embodiments, J1-J6 comprise boom assembly joints that are automatically controlled based on input from the operator to control aerial platform 116 to a particular location. Similarly, a three-dimensional location (e.g., waypoint), may be provided by an operator in a user interface and J1-J6 may be controlled to move aerial platform 116 or boom tip 110 to the location. In some embodiments, optical sensors may detect the work environment and aerial platform 116 or boom tip 110 may be moved to the work environment autonomously. Furthermore, in some embodiments, a location of the work environment may be known through GPS or short-range communication, and aerial platform 116 or boom tip 110 may be autonomously moved to the location. As such, all actuators associated with operating J1-J6 may be controlled manually or autonomously.

In some embodiments, J1-J6 may comprise any actuators including electromechanically-operated, hydraulically-operated, pneumatically-operated, mechanically-operated, linear, non-linear, and rotary, actuators. As such, any actuators may be used that may be controlled by the below-described controllers and may be operable by any energy source. The energy flow may be controlled by actuating valves controlling the flow of hydraulic or pneumatic fluid. Piston, pressure, and speed may be detected by the various sensors described above to provide feedback to the controllers. The controllers may comprise any linear, non-linear, and adaptive control.

As shown, J1 comprises a turntable disposed on the base (i.e., utility vehicle 102). J1 may provide 360 degrees of rotation to boom assembly 104 such that aerial platform 116 may be placed on or near the ground to pick up workers and reach the working environment in any of the forward and rear positions shown in FIG. 3B. The rotation provided by J1 may be a rotation about the z axis (as labeled in FIG. 3A) provided at the base in the displayed coordinate system 168.

J2, in some embodiments, comprises a second rotation of boom assembly 104. J2, as shown, comprises a hydraulically actuated J2 cylinder 170 forcing boom assembly 104 lower boom section 106 rotation about the x axis at lower boom linkage 172.

J3, in some embodiments, provides linear actuation along lower boom section 106 of boom assembly 104. The linear actuation may be provided by a piston (not shown) on, or in, boom assembly 104 that may be actuated by hydraulic energy provided by a hydraulic motor at the base and operable by hydraulic valves.

J4, in some embodiments, comprises J4 cylinder 174, attached to upper boom section 108 at J4 pivot point 176 providing rotation at J4 pivot point 178. J4 may provide rotation of upper boom section 108 relative to lower boom section 106. J4 may comprise an actuator (e.g., J4 cylinder 174) configured to rotate upper boom section 108 relative to lower boom section 106 based on the commands provided by the below-described controllers. In some embodiments, J4 provides rotation about the x axis as shown, or the same rotational axis as J2.

J5, in some embodiments, comprises slew drive system 124. As described above, slew drive system 124 may provide rotation similarly to J2 and J4 about the x axis, as shown. J5 may provide rotation to aerial platform 116 relative to upper boom section 108.

Figure 3B:
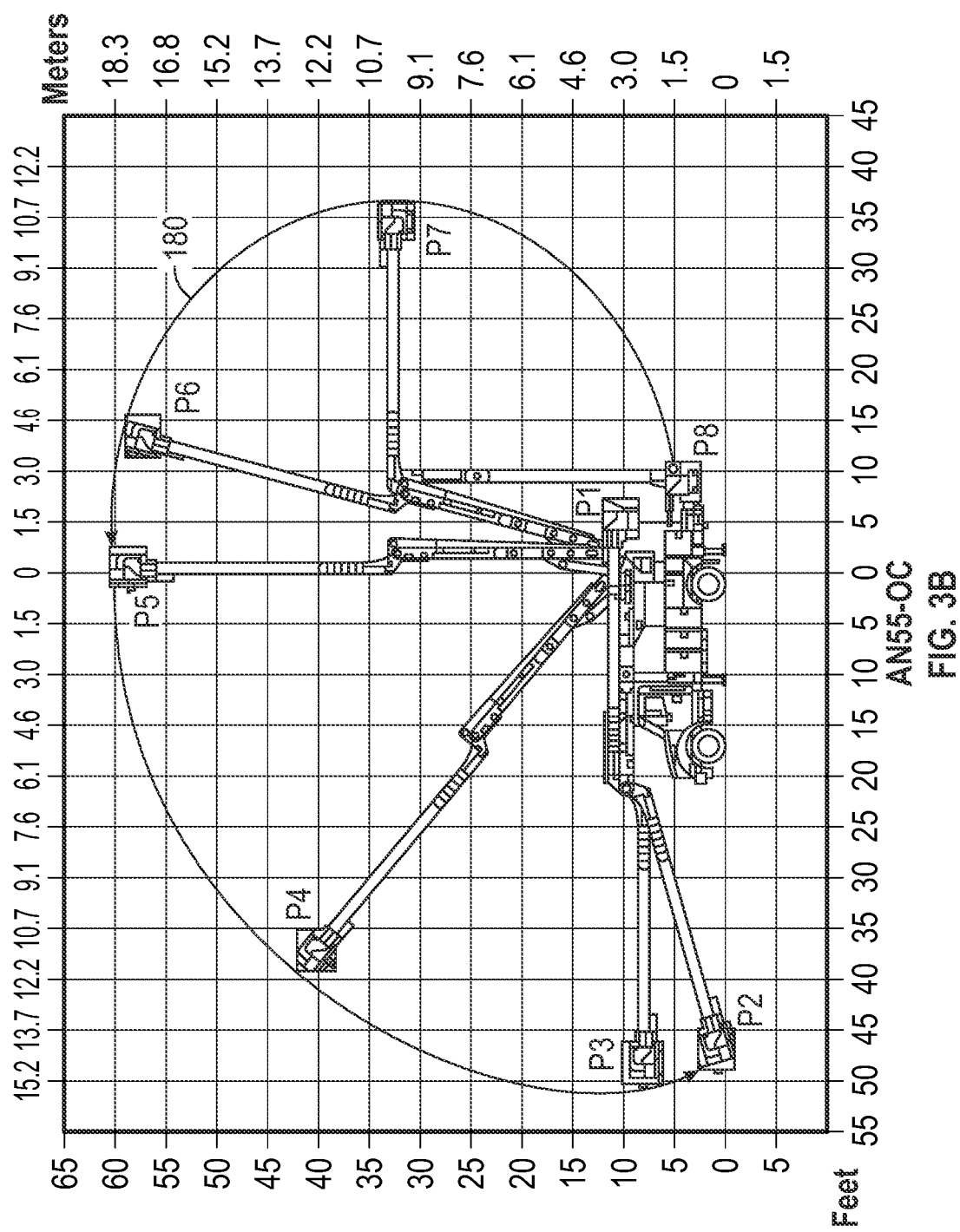
FIG. 3B depicts exemplary rotational motion of boom assembly implementing slew drive aerial platform leveling.

FIG. 3B depicts an exemplary rotational motion of boom implementing slew drive leveling to maintain leveling of aerial platform 116. The rotation of boom assembly 104 from first position P1 to various deployed positions (P2-P8) are shown. The stowed position P1 is depicted when boom assembly is stowed on top of utility vehicle 102. J2, J4, and J5 rotate throughout each position shown creating track 180 in the process of the motion. P2 illustrates aerial platform 116 on or near the ground such that workers may enter aerial platform 116. This is achieved by lower boom section 106 remaining on utility vehicle 102 in the stowed position while J4 is actuated to lower upper boom section 108 downwards until aerial platform 116 is on, or near, the ground. Once the workers and any equipment are in aerial platform 116, J4 may be actuated such that upper boom section 108 and lower boom section 106 are aligned or in a parallel configuration as illustrated in P3-P6. From P3 to P6 only J2 is actuated rotating boom assembly 104 to vertical at P5 and beyond at P6. From P6 to P8 J4 is actuated to rotate upper boom section 108 through to P7 illustrating upper boom section 108 perpendicular to the gravity vector and P8 illustrating upper boom section 108 again parallel to the gravity vector. It should be noted that boom assembly 104 may be stopped at any position along track 180 and that not only P1-P8 may be used but theoretically, an infinite number of positions may be achieved along track 180. Furthermore, slew drive 126 may be commanded to maintain aerial platform 116 leveling throughout any orientations of boom assembly 104.

J1, J3, and J6 are not actuated in FIG. 3B. It should be noted that the actuation of J1, J3, and J6 may not change the angle of aerial platform 116 relative to the gravity vector, but the actuation of J1, J3, and J6 may result in vibration and jerk of aerial platform 116. This vibration and jerk may be modeled and compensated for using the below-described controllers to minimize the effects on aerial platform 116. In each position, and throughout track 180, aerial platform 116 maintains level attitude by the rotation of slew drive 126.

Figure 3C:
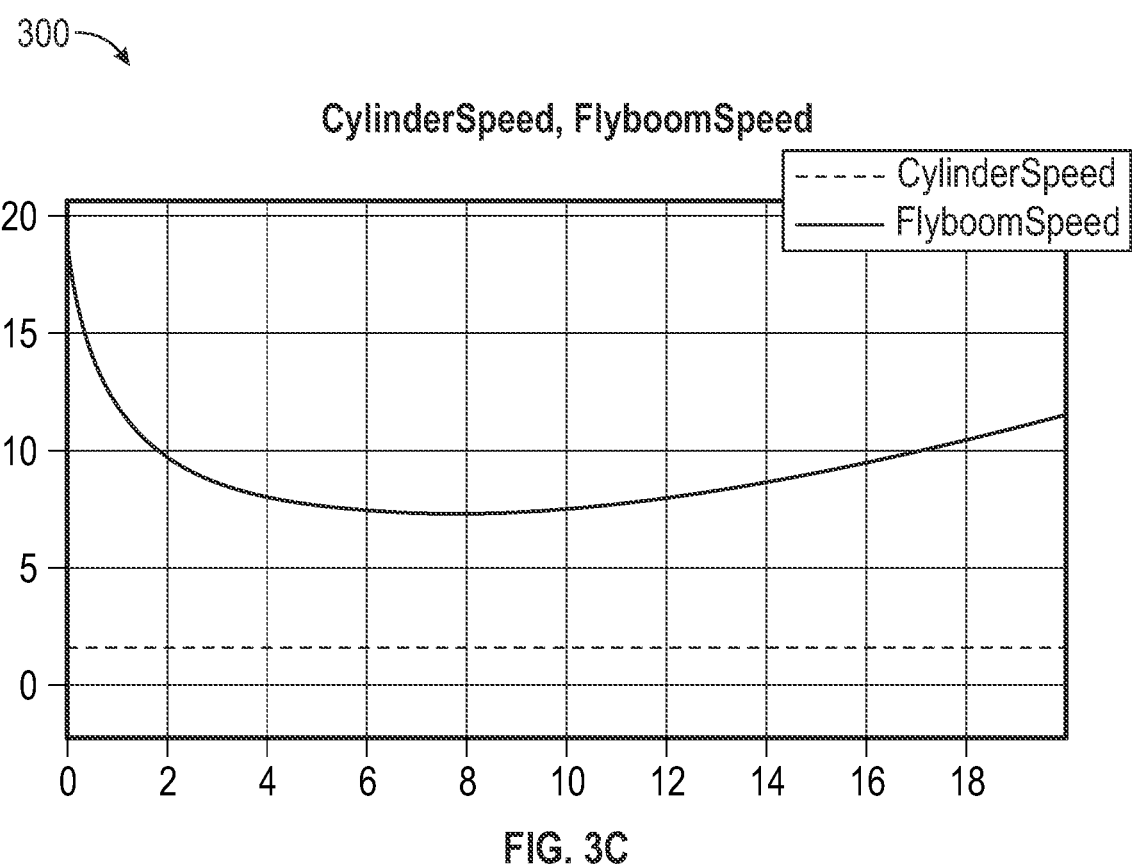
FIG. 3C depicts an exemplary relationship between cylinder speed and boom assembly speed.

FIG. 3C depicts an exemplary relationship between cylinder speed of J4 cylinder 174 and fly boom (e.g., upper boom section 108) speed in chart 300. As described above, J2 cylinder 170 may be commanded to rotate boom assembly 104 at J2. The relationship between J2 cylinder speed and boom assembly 104 speed is non-linear as is the relationship between J4 and upper boom section 108 rotation. Therefore, when a constant input is applied by an operator or a constant input is commanded, the boom assembly speed is not constant. As such, various methods may be employed to control a constant speed output of the boom such as, for example, look up tables based on position, calculating and/or measuring rates and controlling the speed as a second order controller, and the like. The non-linear relationship may apply to all actuators on boom assembly 104 actuating J1-J6 in various non-linear relationships as FIG. 3C is exemplary.

Boom Assembly and Slew Drive Motion Control

Figure 4A:
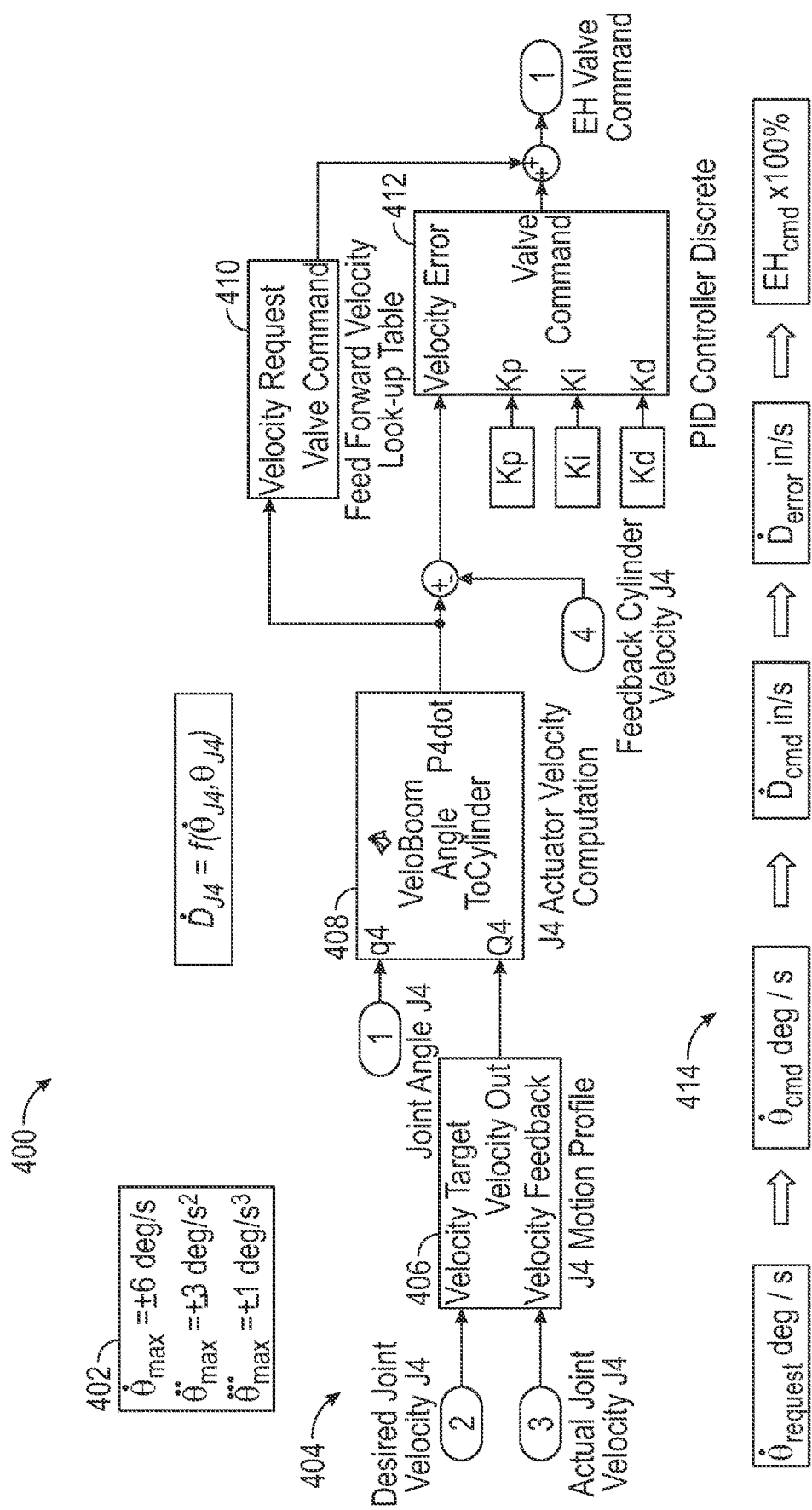
FIG. 4A depicts an embodiment of J4 controller.

FIGS. 4A-4E depict exemplary control algorithms that may be used to control various sections of boom assembly 104 including slew drive system 124. FIG. 4A depicts an exemplary J4 controller 404 for commanding an exemplary electrohydraulic (EH) valve for J4 velocity. In some embodiments, J4 motion comprises angular position, angular velocity, and angular acceleration of J4. The J4 motion may be indicative of a relationship between lower boom section 106 and upper boom section 108. Furthermore, in some embodiments, angular rates may be limited (limits 402) to maintain comfort for the worker in aerial platform. For example, angular velocity may be limited to +6 deg/s, angular acceleration may be limited to +3 deg/s$^2$, and a third derivative of angular position (referenced herein as jerk) may be limited to +1 deg/s$^3$. J4 is used here as an example. It should be noted that the relationships between various boom sections may hold for any joint. Furthermore, any a relationship between any joint motion and leveling bearing 130 of slew drive 126 to level aerial platform 116 may be known from experimental testing and/or may be achieved in real time using the sensor outputs described above with the controllers described herein.

In some embodiments, controllers 400 depicted in FIGS. 4A-4E may comprise computing component 164. Computing component 164 may be composed of the computing system 600 (FIG. 6) described below. Controllers 400 described herein may comprise non-transitory computer-readable media storing computer-executable instructions that, when executed by at least one processor, perform the steps described and shown.

Continuing with the exemplary J4 controller 404, at step 406, inputs may be measured and/or calculated J4 velocity and a desired J4 velocity based on input commanded by the operator requesting a desired velocity or a desired position of aerial platform 116 using controls positioned at aerial platform 116 or from a remote controller. The inputs may be provided to J4 motion profile and the J4 motion profile output velocity may be calculated. At step 408, the J4 output velocity and J4 angle (angle between lower boom section 106 and upper boom section 108) may be provided over time to determine the associated J4 actuator velocity. In some embodiments, the J4 angle may be determined by inclinometers on each section or by rate/position encoders disposed on the J4 actuator. In some embodiments, linear sensors disposed on J4 cylinder 174 may detect position and velocity of J4 cylinder indicative of J4 angle by calculation from the three or four bar linkage. An exemplary actuator to J4 velocity function is provided in FIG. 3C and described above. Feedback actuator velocity (measured or calculated) may be subtracted from the actuator velocity output to determine the actuator velocity error for input into J4 PID controller 412. Furthermore, the actuator velocity output may be fed forward and converted to valve command utilizing a lookup table of known relationships (step 410) and combined with the J4 PID controller output for commanding the EH valve controlling energy to the J4 actuator. The EH valve may provide energy to actuate the J4 actuator (e.g., J4 cylinder 174). Control for J2 may be similar to the exemplary control of J4. J4 controller workflow 414 is shown.

Figure 4B:
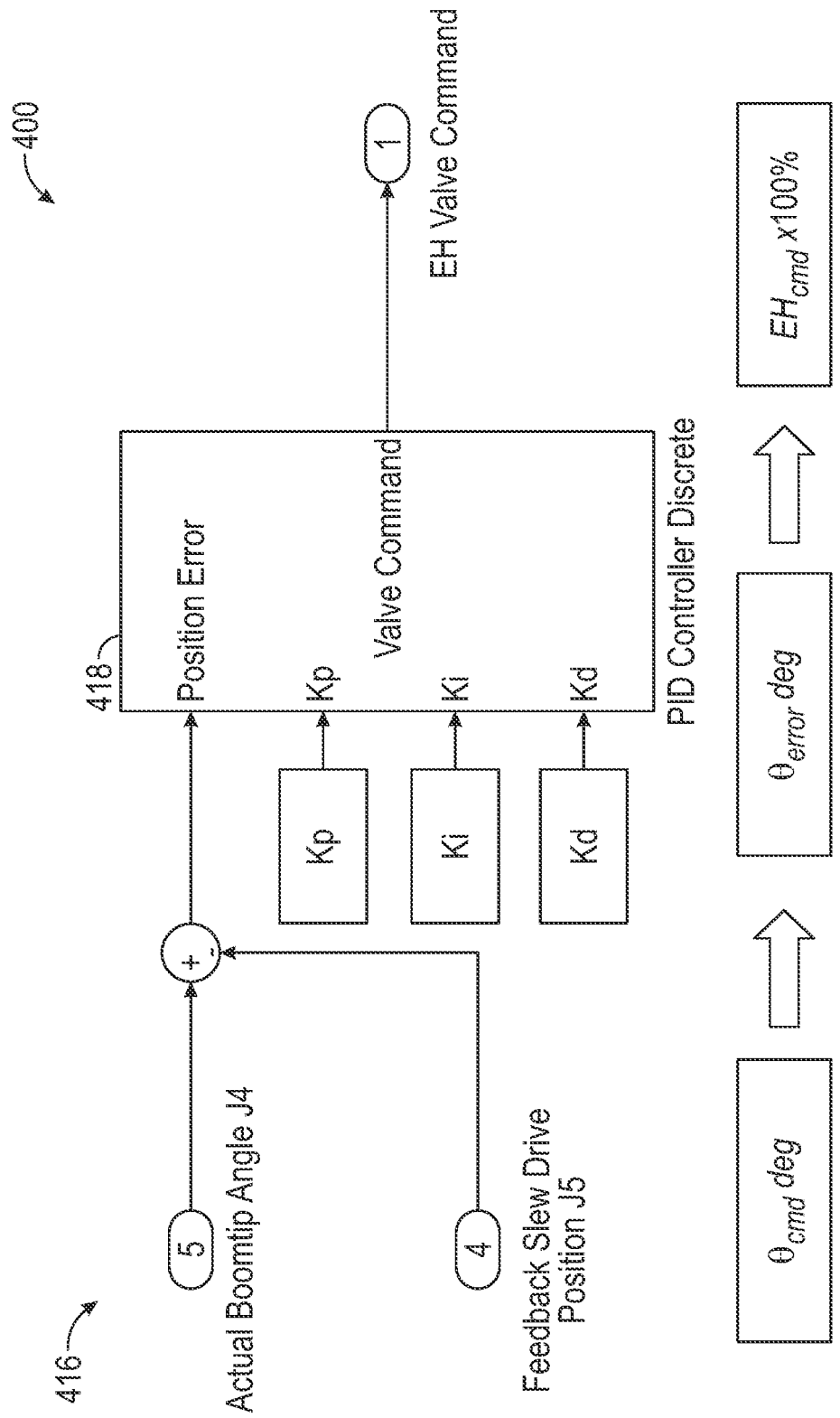
FIG. 4B depicts a first embodiment of J5 leveling controller.

FIG. 4B depicts a first embodiment of J5 leveling controller 416 for leveling aerial platform 116 based on measured boom tip angle and J5 feedback position of slew drive 126. In some embodiments, leveling encoders 140 may detect a position of leveling bearing 130 and a relationship between boom tip 110 position/angle and leveling bearing 130 position providing level aerial platform 116 may be known. The boom tip 110 angle may be determined from various other angles such as J2 and J4 actuator measurements and/or lower boom section 106 and upper boom section 108 measures described above. In some embodiments, the actual boom tip 110 angle may be determined from an inclinometer, IMU, and the like positioned on boom tip 110 and/or upper boom section 108. The measured slew drive feedback position may be subtracted from the actual boom tip angle to determine an angle error between known level relative to boom tip and slew drive position. The position error may be fed into J5 PID controller 418 to determine EH valve command to actuate slew drive 126 to level aerial platform 116. J5 boom tip-to-slew drive workflow 420 is shown.

Figure 4C:
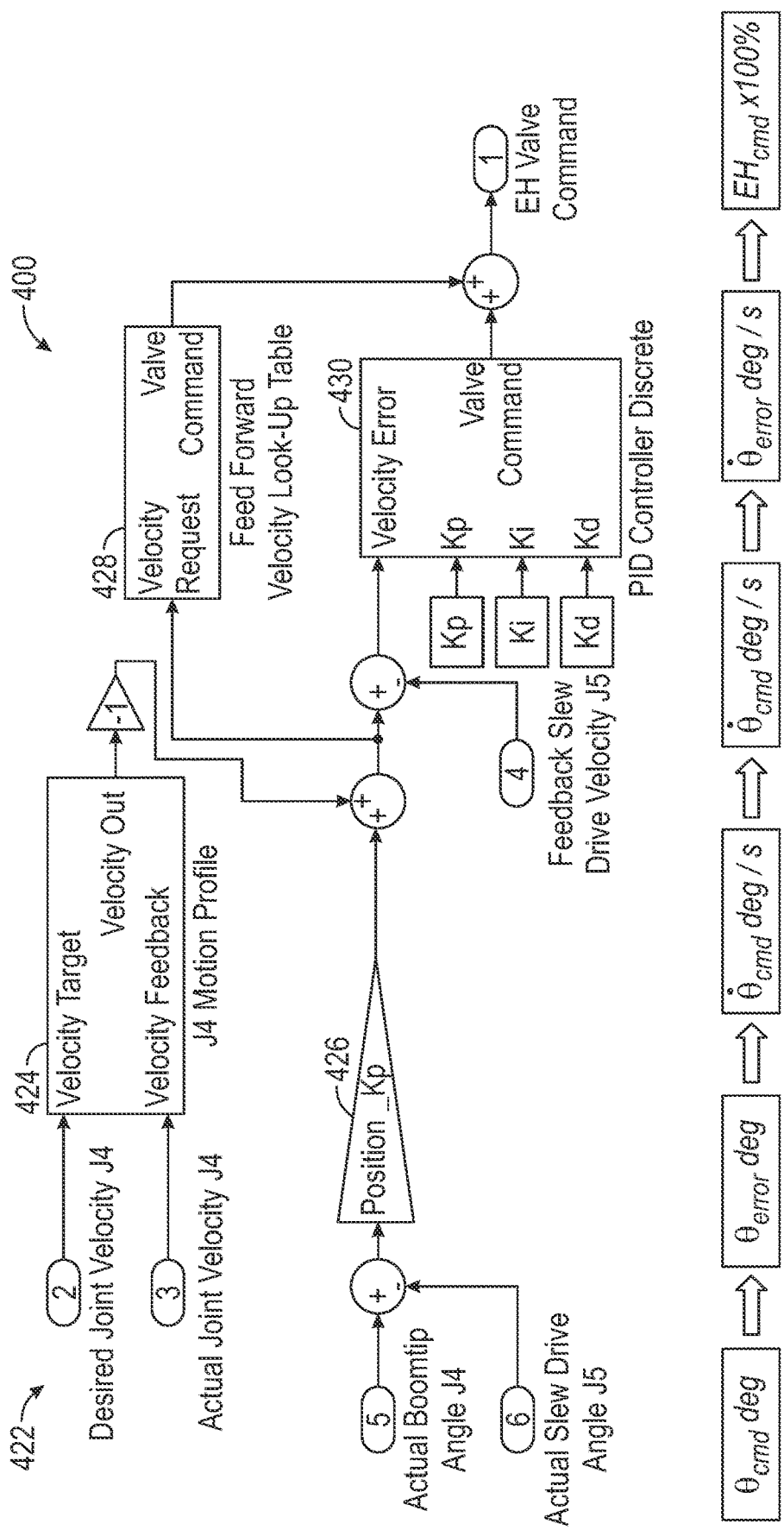
FIG. 4C depicts a second embodiment of J5 leveling controller.

FIG. 4C depicts an embodiment of J5 leveling controller 422 combining the positions and velocities described above. The J4 velocity output is determined at step 424 as described above at step 406. Furthermore, the position difference between actual boom tip angle (J4) and slew drive angle (J5) is determined and converted to velocity dimensions step 426 and combined with the J4 velocity output. The combined velocity output is used to determine valve command at step 428 using the lookup tables. The slew drive velocity measurement may be subtracted from the combined velocity output to determine the velocity error for input provided into J5 PID controller 430. J5 PID controller 430 may determine the command value for EH valve to control the change in velocity of leveling bearing 130 based on the velocity error. The J5 leveling controller workflow 432 is shown.

Figure 4D:
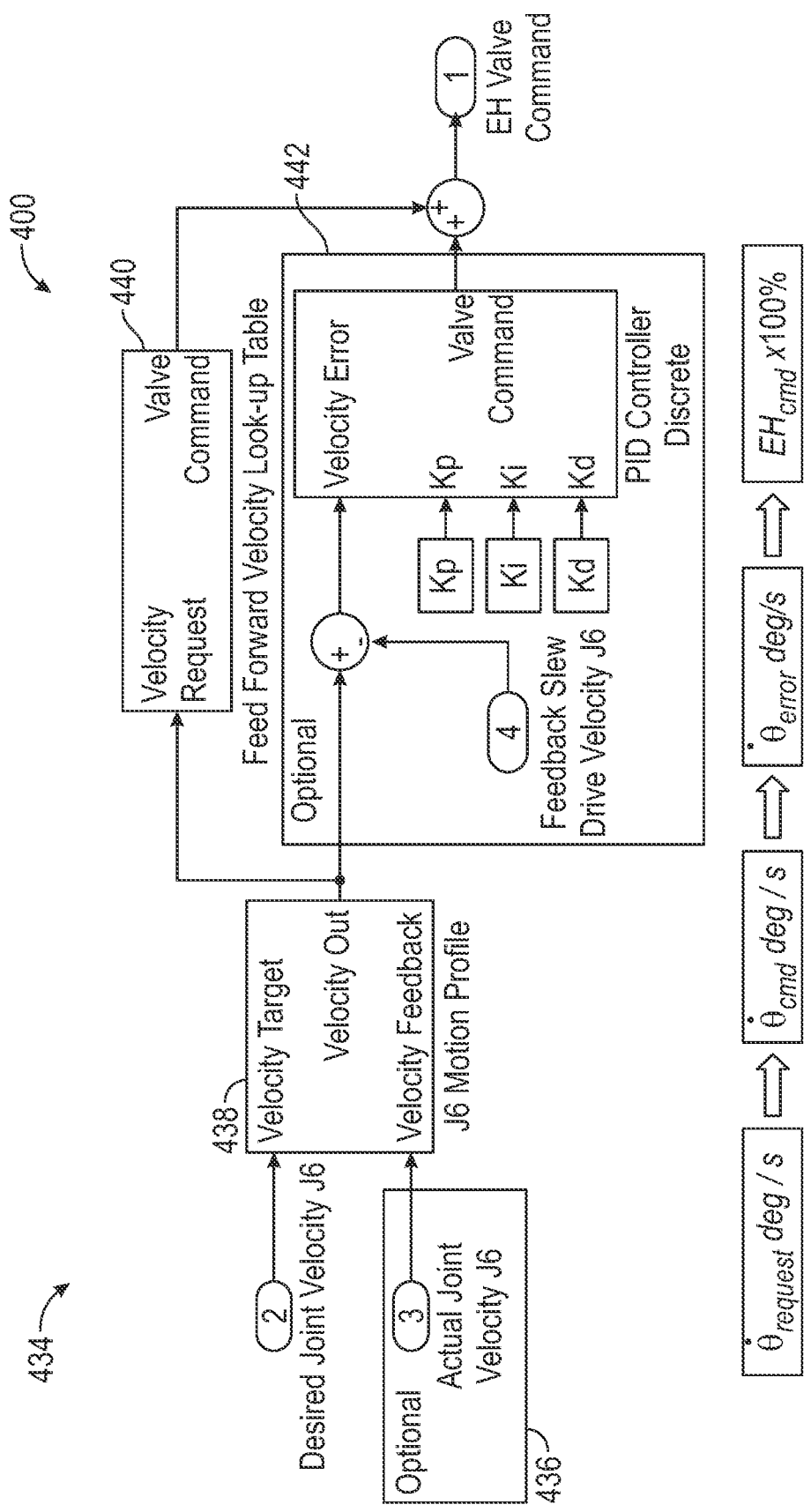
FIG. 4D depicts an embodiment of J6 aerial platform rotation controller.

FIG. 4D depicts an embodiment of J6 platform rotation controller 434. In some embodiments, J6 may comprise an actuator (rotate bearing 132) configured to rotate aerial platform perpendicularly to slew drive 126 as shown in FIG. 2C and described in detail above. The actual velocity of rotate bearing 132 may be determined from position and rate encoders and/or determined via calculations based on time at step 436. The desired input joint velocity and the actual joint velocity may be fed into J6 motion profile at step 438 to determine a J6 velocity request. The J6 velocity request may be fed into J6 lookup tables (step 440) to determine an actuator command corresponding to the associated velocity request. The actuator command (e.g., EH valve command) may command the actuator to provide the necessary energy/signal to rotate bearing 132 to rotate aerial platform 116 at the requested velocity.

Furthermore, in an optional scenario, the J6 velocity error may be determined by subtracting the measured slew drive velocity and the velocity error may be fed into J6 PID controller 442 to determine the valve command based on the velocity error. The valve output command may then be provided to the J6 actuator or a hydraulic valve providing energy to J6 actuator controlling rotate bearing 132. Here, J6 actuation may be based on certain pre-determined states of aerial platform 116. For example, P2 may be a state of aerial platform 116 on the ground. J6 may be actuated to rotate aerial platform 116 to a specific horizontal angle to provide easy entry. P7 may be a state of work in the work environment. Again, J6 may be rotated based on the configuration of boom assembly 104 to a deployed position. J6 may be actuated to rotate aerial platform 116 to a position such that the worker in aerial platform 116 can perform work in the working environment. J6 controller workflow 446 is shown.

In some embodiments, J6 may be automatically actuated to maintain a yaw orientation relative to the working environment when J1 (e.g., turntable), or other joint, is actuated. As such, yaw angle may be controlled to aerial platform attitude to perform work when any other joints (J1-J4) are actuated. Furthermore, pitch and roll may also be controlled in a similar manner. Though pitch control is described in relation to slew drive 126 at J5 and yaw control is described at J6 comprising any linear or rotary actuators, it should be noted that roll may be controlled similarly by incorporating slew drive 126 or any other above-described actuators orthogonally to J5 and J6 to control roll. Similarly, any actuators described herein may be implemented at any angle. Accordingly, aerial platform 116 may remain stable and steady in the working environment while any components of aerial device 100 undergo commanded or uncommanded motion.

Figure 4E:
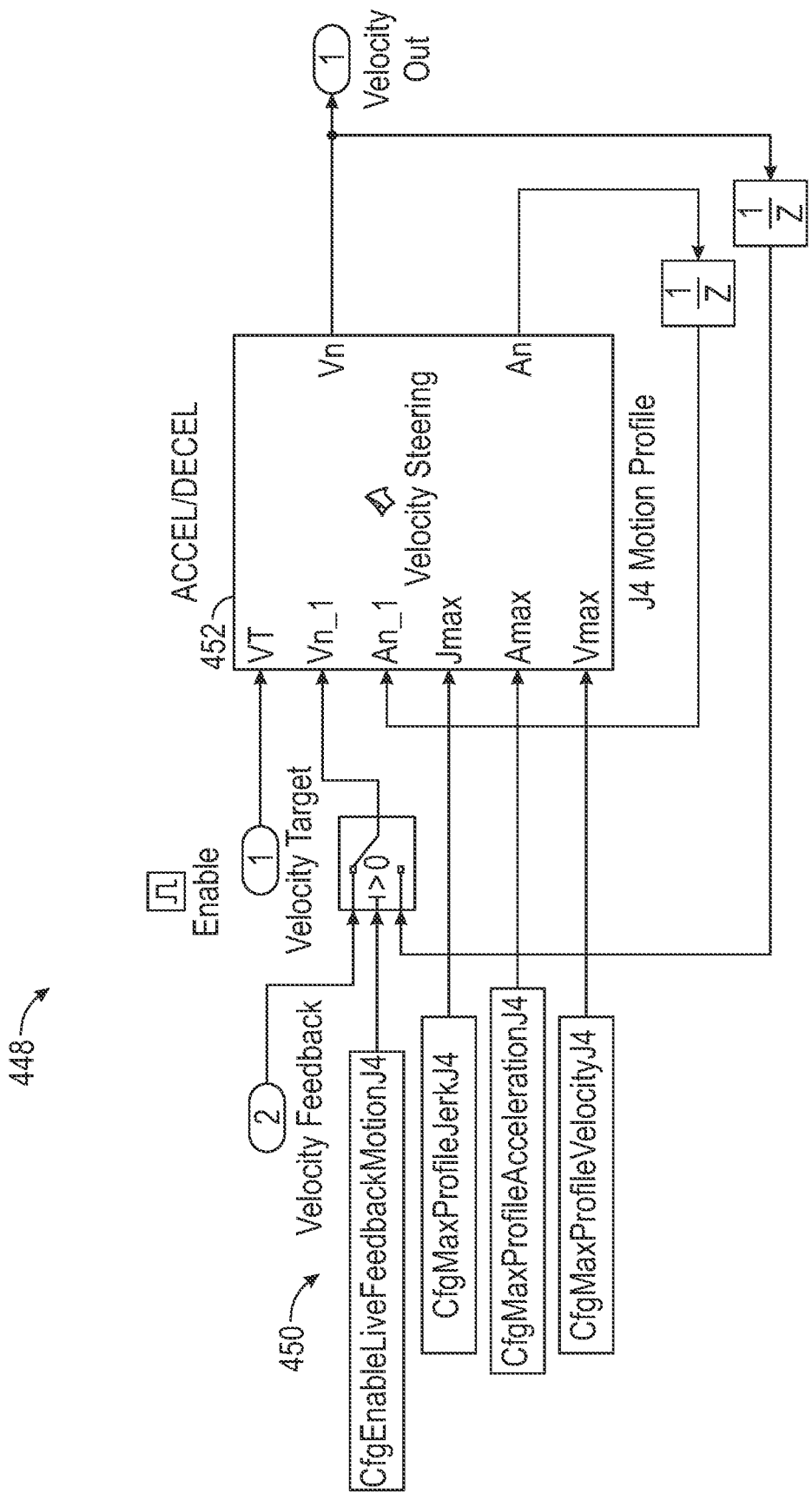
FIG. 4E depicts an embodiment of third-order jerk controller.

FIG. 4E depicts an embodiment of 3rd order jerk controller 448. In some embodiments, the jerk limiting controller may be based in configuration and/or state of boom assembly 104. Jerk control inputs 450 may be input into J4 motion profile 452 and may be target velocity of J4, measured J4 velocity feedback, J4 motion feedback, max J4 jerk, max J4 acceleration, and max J4 velocity. As shown in FIG. 4A, in some embodiments, J4 angular velocity may be limited to +6 deg/s, angular acceleration may be limited to +3 deg/s$^2$, and jerk may be limited to +1 deg/s$^3$. As such, the velocity out may be the command velocity for J4 comprising the limit conditions. The 3rd order jerk controller 448 may be placed at any of the J4 motion profiles described in any of controllers 400 described above.

FIG. 4F depicts the components of the exemplary aerial platform motion profile 454 with limits with the vertical axis representing angle in degrees and the horizontal axis representing time in seconds. As shown, jerk is limited to +2 deg/s$^3$ providing maximum acceleration of approximately +1.5 deg/s$^2$, a smooth velocity with a maximum of approximately +3 deg/s, and a smooth position change profile. The joint limiting controller may be applied to any joint on boom assembly 104.

Methods of Leveling the Aerial Platform with the Slew Drive System

Figure 5:
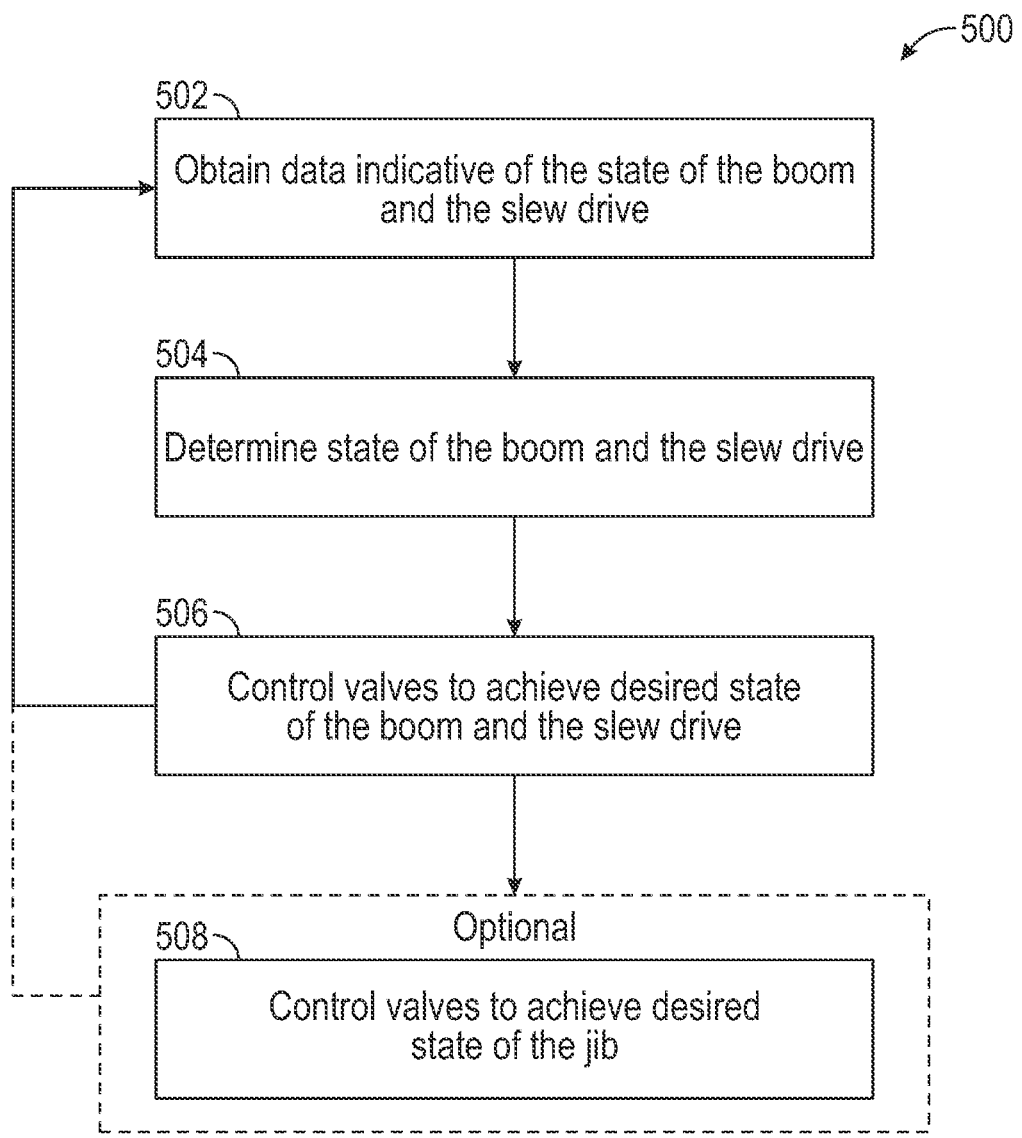
FIG. 5 depicts a flow chart illustrating an embodiment of slew drive aerial platform leveling.

FIG. 5 depicts a flow chart 500 illustrating an embodiment of leveling aerial platform 116 using slew drive system 124. At step 502, sensor data may be obtained from sensors and data stores of slew drive system 124 as described above. The sensors may be disposed at various locations on boom assembly including J1-J6, aerial platform 116, actuators, valves, cylinders, as well as at any location on any boom section of boom assembly 104. The sensors may be configured to collect the sensor data for calculation of position, velocity, acceleration, and jerk from parameters indicative of states/configurations of boom assembly 104. The sensor data may provide real-time feedback information to the above-described controllers. Furthermore, input data may be obtained from controls in aerial platform 116, or data stores providing data necessary to achieve desired states of aerial platform 116 and boom assembly 104.

At step 504, the sensor data and the input data may be used to determine velocity and positions of various components of boom assembly 104 and drive velocity and drive positions of actuators to command of leveling bearing 130 of slew drive, boom assembly 104, aerial platform 116, and the like. Exemplary parameters may be position, velocity, acceleration, and jerk and may be represented by linear or angular dimensions as described in embodiments above. The position and velocity commands as well as the determined output actuator commands may be updated each time step to update slew drive system 124 for real-time feedback control. In some embodiments, correlations between parameters and relationships between each joint, boom section, actuator, position, velocity, and the like may be determined and lookup charts and relationships between components may be updated automatically using adaptive control methods.

At step 506, slew drive 126 may be controlled to level aerial platform 116 as described in embodiments above. The actuator command outputs (e.g., EH valve command) from controllers 400 may be sent to various actuators to control the motion of aerial platform 116 by controlling the motion of boom assembly 104, slew drive 126, and rotate bearing 132 (at optional step 508). The various actuators may be controlled based on the actuator command outputs to control J1-J6 based on user input, automatic inputs based on desired autonomous states, and feedback information from the various sensors described above. As such, aerial platform 116 may be controlled by operators and autonomously to a working environment while maintaining a level attitude and limiting velocity, acceleration, and jerk of boom assembly 104 and aerial platform 116.

Computing Platform

Figure 6:
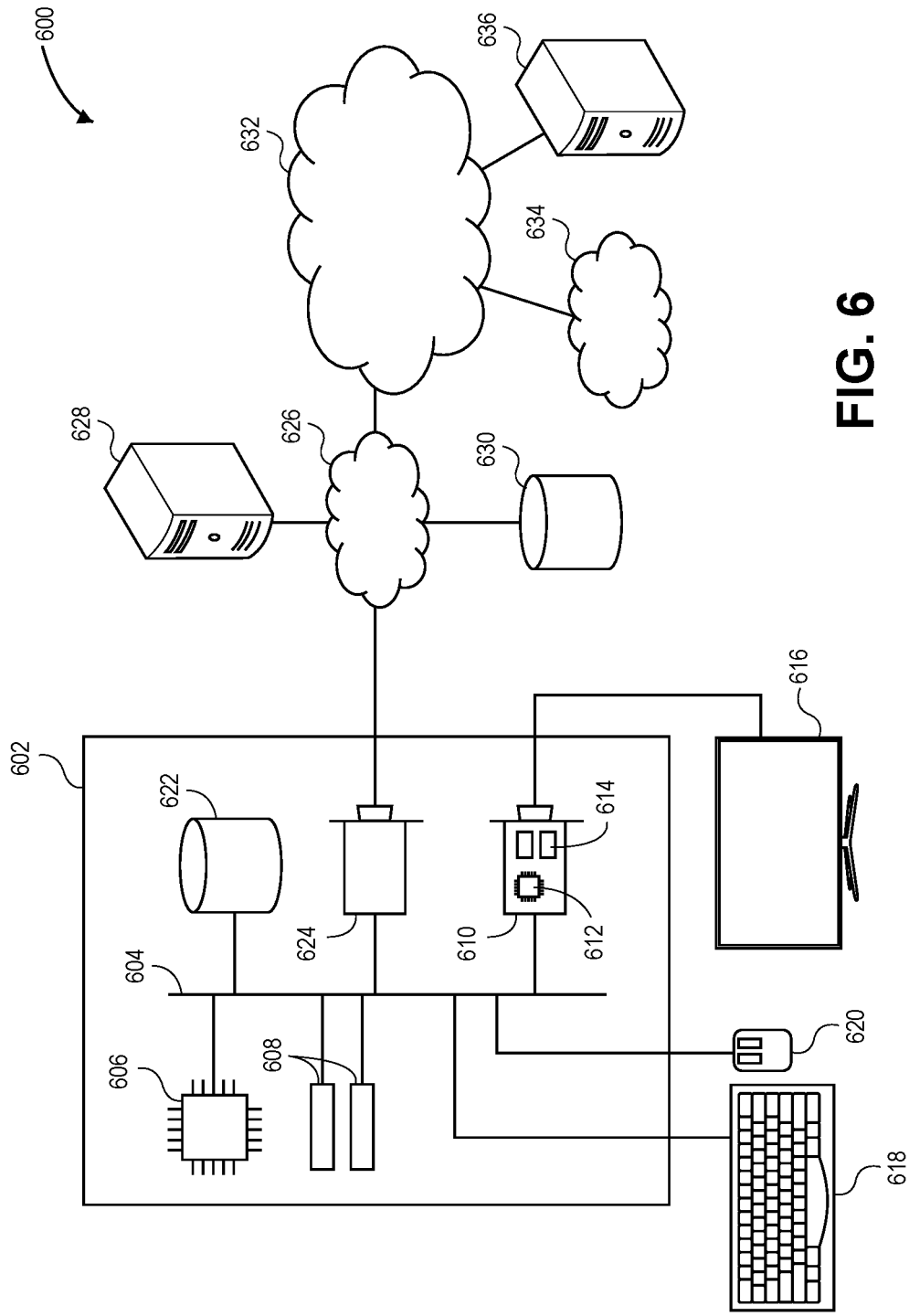
FIG. 6 depicts an exemplary hardware platform for embodiments of the disclosure.

Turning first to FIG. 6, an exemplary hardware platform of computing system 600 for certain embodiments of the invention is depicted. Computer 602 can be a desktop computer, a laptop computer, a server computer, a recording device manager, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Additionally, any number of sensors (not shown) such as the biometric sensor discussed above may also be connected to system bus 604. Like display 616, these peripherals may be integrated into computer 602 or absent. Also, connected to system bus 604 is local storage 622, which may be any form of computer-readable media, and may be internally installed in computer 602 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In certain embodiments, computer 602 can itself be directly connected to Internet 632.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

The invention claimed is:

1. A slew drive system for leveling an aerial platform of an aerial device, comprising:
   a slew drive disposed at a boom tip of a boom assembly of the aerial device,
   wherein the slew drive is positioned between the boom tip and the aerial platform and is configured to rotate the aerial platform relative to the boom tip;
   a first set of sensors disposed directly on the boom tip detecting at least an angle of the boom tip relative to gravity;
   a second set of sensors detecting a drive position of a leveling bearing of the slew drive; and
   at least one controller configured to:
      obtain at least the angle of the boom tip relative to gravity from the first set of sensors and at least the drive position from the second set of sensors;
      determine a leveling bearing command based at least in part on the angle of the boom tip and the drive position of the leveling bearing of the slew drive; and
      cause transmission of the leveling bearing command to the leveling bearing to control the leveling bearing to maintain a level attitude of the aerial platform.

2. The slew drive system of claim 1,
   wherein the first set of sensors comprises at least an accelerometer configured to detect a gravity vector relative to the angle of the boom tip, and
   wherein the at least one controller is further configured to determine the leveling bearing command based on the gravity vector relative to the angle of the boom tip.

3. The slew drive system of claim 1, further comprising at least one actuator configured to control a rotation of the aerial platform perpendicularly to the rotation of the slew drive.

4. The slew drive system of claim 3,
wherein the at least one actuator provides at least 180 degrees of rotation and is controlled by an operator in the aerial platform, and
wherein the slew drive provides at least 270 degrees of operable rotation to the aerial platform.

5. The slew drive system of claim 1, further comprising:
a third set of sensors disposed on the boom assembly; and
a third-order controller,
wherein the third-order controller is further configured to limit a boom velocity, a boom acceleration, and a boom jerk of the aerial platform based at least in part on an angular rate, an angular acceleration, and an angular jerk associated with a joint or a boom section of the boom assembly.

6. The slew drive system of claim 1, wherein a velocity of the boom tip and a drive velocity of the slew drive are input parameters input into the at least one controller configured to maintain the level attitude of the aerial platform.

7. The slew drive system of claim 1,
wherein the first set of sensors is disposed at a joint of the boom assembly and a joint angle of the joint is indicative of the angle of the boom tip; and
wherein the angle of the boom tip is based at least in part on the joint angle of the boom assembly.

8. The slew drive system of claim 1, wherein the angle of the boom tip is controlled by an automated request to change a configuration of the boom assembly.

9. A slew drive system for leveling an aerial platform of an aerial device, comprising:
a slew drive disposed at a boom tip of a boom assembly of the aerial device,
wherein the slew drive is positioned between the boom tip and the aerial platform and is configured to rotate the aerial platform relative to the boom tip;
a first set of sensors disposed on the boom tip and detecting boom tip parameters indicative of a boom tip state,
wherein the boom tip parameters include a boom tip angle between the boom tip and gravity;
a second set of sensors detecting leveling bearing parameters indicative of a leveling bearing state of a leveling bearing of the slew drive,
wherein the leveling bearing parameters includes a leveling bearing position; and
at least one controller configured to:
obtain the boom tip parameters and the leveling bearing parameters;
determine a leveling bearing command based at least in part on the boom tip angle and the leveling bearing position; and
cause transmission of the leveling bearing command to the leveling bearing to control the leveling bearing to maintain a level attitude of the aerial platform.

10. The slew drive system of claim 9,
wherein the boom tip parameters comprise an angle of an upper boom section of the boom assembly; and
wherein the leveling bearing parameters comprise at least a position of the leveling bearing.

11. The slew drive system of claim 10,
wherein the boom tip parameters further comprise an angular rate of the upper boom section; and
wherein the leveling bearing parameters comprise at least a rate of the leveling bearing.

12. The slew drive system of claim 11, wherein the at least one controller is further configured to:
determine an angular acceleration of the upper boom section; and
determine the leveling bearing command further based on limiting the angular acceleration of the upper boom section.

13. The slew drive system of claim 9,
wherein the boom tip parameters comprise at least an angle of a joint of the boom assembly and an angular rate of the joint, and
wherein the leveling bearing parameters comprise at least a position and a speed of the leveling bearing.

14. The slew drive system of claim 9,
further comprising at least one sensor configured to detect an angle of gravity at the boom tip; and
wherein the at least one controller is further configured to:
obtain the angle of gravity from the at least one sensor; and
determine the leveling bearing command further based on the angle of gravity relative to the boom tip.

15. A method of leveling an aerial platform of an aerial device, the method comprising:
detecting, by at least one sensor disposed on a boom tip of a boom assembly of the aerial device, at least a boom tip angle relative to gravity;
detecting a drive position of a leveling bearing of a slew drive,
wherein the slew drive is positioned between the boom tip and the aerial platform and is configured to rotate the aerial platform relative to the boom tip;
determining, by at least one processor, a leveling bearing command based at least in part on the boom tip angle and the drive position of the leveling bearing; and
causing, by the at least one processor, transmission of the leveling bearing command to the leveling bearing to maintain a level attitude of the aerial platform.

16. The method of claim 15, further comprising:
determining an angle of a joint of the boom assembly and an angular rate of the joint; and
determining the leveling bearing command further based on the angle of the joint and the angular rate of the joint.

17. The method of claim 15, further comprising limiting velocity, acceleration, and jerk of at least one joint of the boom assembly.

18. The method of claim 15, wherein the leveling bearing provides at least 270 degrees of operable rotation to the aerial platform.

19. The method of claim 18, wherein the leveling bearing is a gear drive.

20. The method of claim 15, wherein the method further comprises rotating the aerial platform in a range of 180 degrees perpendicularly to a rotation of the leveling bearing by a rotate bearing disposed between the leveling bearing and the aerial platform.

* * * * *